Oct. 5, 1971 LEV VAAGOVICH SARADZHEV 3,609,945

SHUT-OFF FILTERING DEVICE TO BE USED IN VESSELS FOR STORING SUBSTANCES, MAINLY HIGH-PURITY AND DECOMPOSABLE SUBSTANCES

Filed Sept. 12, 1969 18 Sheets-Sheet 6

3,609,945

SHUT-OFF FILTERING DEVICE TO BE USED IN VESSELS FOR STORING SUBSTANCES, MAINLY HIGH-PURITY AND DECOMPOSABLE SUBSTANCES

Lev Vaagovich Saradzhev, 3 Parkovaya ul. 50, korp. 3, kv. 52, Moscow, U.S.S.R.

Filed Sept. 12, 1969, Ser. No. 857,465
Int. Cl. B01d 50/00
U.S. Cl. 55—250 19 Claims

ABSTRACT OF THE DISCLOSURE

A vessel for storing high-purity and decomposable substances comprises two intercommunicating receptacles, the first of which communicates with the ambient medium and is filled with filtering and sorbing materials, preferably solids, while the second receptacle is filled with a liquid sorbent and communicates with the interior of the vessel. The second receptacle is divided by an overflow means into at least two intercommunicating chambers so that the liquid sorbent flows over from chamber to chamber when the pressure inside the vessel is balanced with respect to the outside pressure.

The present invention relates to vessels for storing substances and, more particularly, it relates to shut-off devices to be used in vessels for storing substances, mainly high-purity and decomposable substances.

The development of new fields of science and engineering has brought about an urgent need of high-purity chemical substances to be used in semiconductor, radioelectronic and nuclear industries, in the chemistry of polymers, in the production of high-purity metals and alloys, rare and trace elements, quantum generators, ion-exchange resins, catalysts, as well as in numerous other branches of science and industry.

As the requirements imposed upon high-purity substances grow more strict, special importance is attached to the problems of storing and transporting said substances, charging them into and removing from vessels, as well as of using these substances.

It is known that high-purity substances containing impurities in amounts of less than millionth or milliardth fractions of one percent become contaminated from contact with the walls of a vessel container when stored, and from contact with the environment, and become unfit for further use.

Extreme sensitivity of high-purity substances to the impurities of the container material makes apparent the maximum suitability for the above-listed purposes of substances possessing maximum homogeneity and high erosion stability. Such substances are mostly oxides of elements, e.g. of glass, in particular, quartz, glass, ceramics, polymeric materials (tetrafluoroethylene, polyethylene, vinyl chloride etc.).

When designing tare for storing said substances, provision should be made for storing therein substances decomposing under the effect of light, temperature, or because of some other reasons. Said substances, when decomposing, create considerable excessive pressures, which are likely to cause the destruction of closed vessels whose rigidity is rather low. Conventionally employed containers manufactured from the above-mentioned materials cannot withstand not only the pressure created by the decomposition of the substance but, in some cases, the difference of pressures created as a result of variations in temperature and barometric pressure.

Known hermetic shut-off devices in the form of a blind flange or ground (or screwed) stopper are unfit for use with such substances and materials, since, in this case, it is necessary to balance the pressure inside and outside the vessel (container) and to provide for a thorough purification of influent and effluent media entering the vessel from the outside, without impairing the quality of the substance being stored, as well as to decontaminate the media leaving the vessel in the course of balancing the pressure.

Presently employed vessels (containers) are unsuitable for filling them with high-purity substances and for removing said substances therefrom, since their shut-off devices do not provide for the delivery into the vessel of pure air or some other outside medium for filling the vacant volume in the course of emptying the vessel and do not preclude the contact of the high-purity substance with the outside medium when charging or filling the vessel, as well as when removing and using the substance.

There is known a shut-off device capable of maintaining a constant inside pressure in the vessel with a view to preclude the destruction of the latter. This device comprises an aerosol filter arranged on the neck of the vessel and covered with a protective cap having openings for the passage of gas (cf. "Containers for Chemical Substances" by Krongaus, Moscow, 1961).

However, said known shut-off device does not fully solve the problem of purification of media entering and leaving the vessel, for it is only capable of performing the mechanical removal of particulate contaminants in gases and does not make it possible to perform their chemical purification, as well as the operations of flushing, charging, storing, transporting, removing and using the substance being preserved without impairing the quality thereof.

It is an object of the present invention to develop a shut-off filtering device for vessels, that would make it possible to perform (separately or in combination) operations of flushing, charging, storing, transporting, removing and using a high-purity substance without impairing the quality thereof, at the same time providing for the purification of media entering the vessel, decontamination of media leaving the vessel, and for balancing the inside and outside pressure with a view to precluding the destruction of said vessel.

In the accomplishment of said and other objects, in the shut-off filtering device for vessels, according to the present invention, provision is made of two intercommunicating receptacles, of which one communicates with the outside medium and is filled with filtering and sorbing materials, preferably solids, while the other receptacle is filled with a liquid sorbent and communicates with the interior of the vessel, said other receptacle being divided by an overflow means into at least two intercommunicating chambers so that the liquid sorbent flows over from chamber to chamber when the pressure inside the vessel is balanced with respect to the pressure outside said vessel.

The shut-off filtering device of the invention can be arranged outside the vessel and have a protective cap with a cone-shaped ground surface in contact with the ground surface of the neck of the vessel.

The present shut-off filtering device can have a receptacle, which communicates with the outside medium and is divided by means of partitions into a plurality of intercommunicating sections filled with filtering and sorbing materials.

The shut-off filtering device according to the invention can be fashioned so that the sections filled with filtering and sorbing materials be arranged coaxial with the chambers in which the liquid sorbent flows over.

The shut-off filtering device can be so fashioned that the last-in-row (with respect to the afflux of the outside medium into the space of the vessel) chamber of said other receptacle be connected to the outside medium via a circular clearance, the latter being formed by the central pipe of a central connecting sleeve with openings, which pipe passes through the chambers and sections of the receptacles, without reaching the bottom of the vessel, and is connected to the internal conical wall of said connecting sleeve by means of an auxiliary pipe which is arranged coaxial with the sleeve and divides the interior of the latter into a first auxiliary chamber and a second auxiliary chamber, said second auxiliary chamber being formed by said auxiliary pipe and the conical wall of said connecting sleeve.

The shut-off filtering device of the invention can be so fashioned that, for the purposes of storing and transporting substances, onto the conical outer surface of the central connecting sleeve there is fitted a removable cap which serves to isolate the auxiliary chambers from the outside medium and communicates via an opening said first auxiliary chamber with said second auxiliary chamber, which latter chamber receives through an opening the purified outside medium directed via an opening into the interior of the vessel through a hydraulic seal formed by the clearance between the auxiliary pipe and the central connecting sleeve, a clearance between the walls of the lower and upper bodies of the device, and pipes interconnecting said clearances, said hydraulic seal serving to isolate the interior of the vessel from the outside medium.

The shut-off filtering device can be fashioned so that, for the purposes of flushing the internal surface of the vessel and filling the latter with a substance, onto the conical outer surface of the central pipe of the central connecting sleeve there is fitted an attachment including a bypass cock and a coupling connected thereto and adapted to isolate the first auxiliary chamber from the outside medium and from the second auxiliary chamber connected to the bypass cock which, in its turn, is connected to the inlet end of said central pipe.

The present shut-off filtering device can be fashioned so that, for the purposes of removing substances from the vessel and using them, onto the conical outer surface of the central pipe of the central connecting sleeve there is fitted an attachment including a calibrated burette with a shut-off filtering means to which burette there is connected a pipe union with a coupling, said coupling serving to isolate the auxiliary chambers from the interior of the central pipe and connect both said auxiliary chambers to each other and to the interior of the vessel.

The shut-off filtering device according to the present invention can be fashioned so that the sections filled with filtering and sorbing materials are positioned above the chambers in which flows the liquid sorbent.

The shut-off filtering device can be arranged inside the vessel, the central connecting sleeve being passed through said filtering device towards the bottom of the vessel without touching said bottom.

The shut-off filtering device can be so fashioned that, for the purpose of disconnecting the space of the vessel from the receptacles, the upper end of the overflow means is provided with a ground surface mating with a corresponding ground surface of the connecting sleeve by mutual axial displacement of said overflow means and connecting sleeve of the neck of the vessel in the course of flushing and filling the vessel.

The shut-off filtering device can be fashioned so that the sections of said first receptacle filled with filtering and sorbing materials are positioned above said other receptacle in which the chambers with the liquid sorbent flowing therein are arranged coaxially.

For the purpose of disconnecting the interior of the vessel from the device and from the outside medium, the shut-off filtering device can be fitted with a connecting sleeve of the neck of the vessel, which connecting sleeve is provided with a circular sealing projection connectable by mutual axial displacement with a projection of a part and an auxiliary pipe when flushing and filling the vessel.

The shut-off filtering device of the present invention can be fashioned as a body having flanged edges and a cover including a circular projection, which are mated with each other and with the neck of the vessel during the mutual turn of the cover and the body when flushing and filling the vessel, for the purpose of isolating the interior of said vessel from the receptacles and the outside medium.

The shut-off filtering device can be so fashioned that, for the purposes of storing and transporting substances, onto the conical outer surface of the central pipe of the central connecting sleeve there is fitted a removable cap serving to isolate said second auxiliary chamber from the outside medium.

The shut-off filtering device can be so fashioned that, for the purposes of flushing the internal surface of the vessel with a high-purity substance and filling it with same, onto the conical outer surface of the central pipe of the central connecting sleeve there is fitted an attachment including a bypass cock and a coupling connected thereto and adapted to isolate from the outside medium said second auxiliary chamber connected by means of a side pipe with the bypass cock which, in turn, is connected to the inlet cone of said central pipe.

The present shut-off filtering device can be fashioned so that, for the purposes of removing substances from the vessel and using them, onto the conical outer surface of the central pipe of the central connecting sleeve there is fitted an attachment including a calibrated burette with a shut-off filtering means, to which burette there is connected a pipe union with a coupling, said coupling serving to isolate said second auxiliary chamber from the interior of the central pipe.

Therefore, the employment of the present invention makes it possible to store and transport high-purity substances, charge them into and remove from tare, as well as to use high-purity substances, such as nitric and various other acids, water, metal, alkali, carbon and other organic and inorganic, liquid and solid high-purity substances.

Other objects and advantages of the invention will become apparent from the following description in connection with which certain preferred embodiments of the invention have been shown with due reference to the accompanying drawings, in which.

Figure 1:
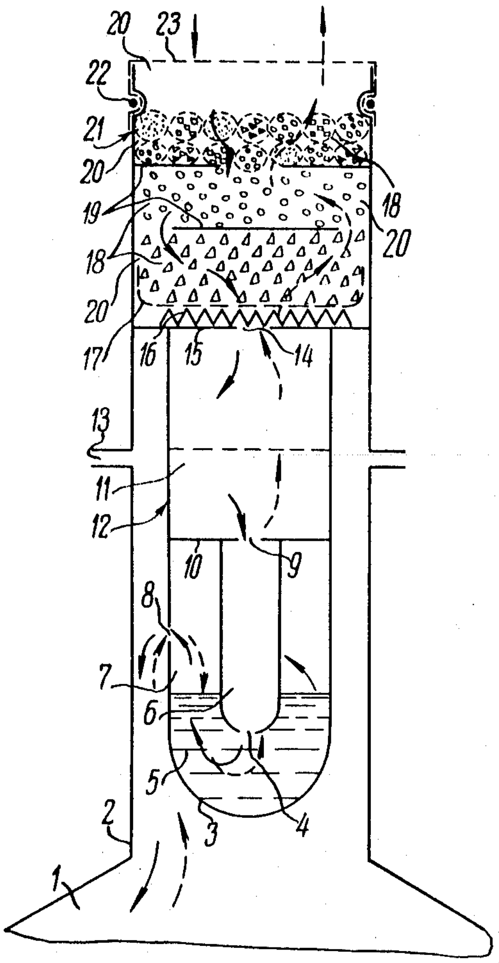
FIG. 1 is a basic diagram of the shut-off filtering device in a vessel according to the invention adapted for storing and transporting high-purity substances.

Now, referring to the drawings, FIG. 1 is a basic diagram of the present shut-off filtering device secured by means of a union 13 to a neck 2 of a vessel 1.

The device according to the invention includes two receptacles, one 21 and the other 12. The receptacles are separated from each other by means of a partition 15 and communicate via an opening 14. Onto the partition 15 there is placed a hydrophobic separator 16 followed by filtering materials 17 and, further, by sorbing materials 18 divided by means of partitions 19 and exposed to sections 20. At the outlet into the environment the first receptacle 21 is closed with filtering materials 23 held in place by a union 22.

The second receptacle 12 is, in turn, divided by means of a partition 10 into at least two chambers, a first chamber 11 and a second one 7 with a dead-end bottom 3. The first chamber 11 is connected via the opening 14 to the first receptacle 21 and, via an opening 9 and an overflow means 6 having an opening 4, communicating with chamber 7. The chamber 7 is connected through an opening 8 to the working space or annular chamber of the vessel 1. One of the chambers 7 or 11 is filled with a liquid sorbent 5 flowing over from chamber to chamber when the pressure in the working space of the vessel 1 is balanced with respect to the pressure outside said vessel.

The shut-off filtering device of the present invention operates in accordance with the following principle.

When the pressure inside the vessel is reduced (as a result of a temperature decrease, increase of barometric pressure, emptying the vessel etc.), the outside medium enters the first receptacle 21 (the direction of movement of said outside medium shown by a continuous arrow) where it is rendered free of mechanical impurities with the aid of the filtering materials 23 and purified from chemical impurities with the aid of the sorbing materials 18 and, further, with the filtering materials 17, to prevent the sorbents from passing into the other receptacle 12.

From the first receptacle 21 the outside medium passes via the opening 14 into the first chamber 11 of the other receptacle 12, forcing the liquid sorbent 5 from the first chamber 11 into the chamber 7 through the openings 9 and 4. After being cleaned in the chamber 7 from the remaining mechanical and chemical impurities in the course of bubbling, saturation and sorption, said outside medium passes into the working space of the vessel 1 through the opening 8.

In case the pressure in the working space of the vessel 1 exceeds that outside the vessel, gas-vapor mixture from the space of the vessel 1 passes via the opening 8 into the chamber 7 of the other receptacle 12, forcing the liquid sorbent 5 via the overflow means 6 into the first chamber 11 (the direction of movement of the gas-vapor mixture shown by a broken arrow, and the position of the liquid sorbent 5 in the chamber 11—by a broken line). Retracting with the liquid sorbent 5 in the other receptacle 12 and wth the sorbing materials in the sections 20 of said first receptacle 21, gases are decontaminated and let out into the environment through the filtering materials 23.

The shut-off filtering device according to the present invention is universal, for it facilitates the variation of relative amounts of filtering and sorbing liquid and solid materials, as well as the selection of said materials as to quality and volume, depending upon the individual properties of a substance being preserved and outside medium.

When using different sorbing materials which are not to be mixed together, said sorbing materials are either separated by insulating layers of filtering materials, or they are placed into bags manufactured from filtering materials; the bags are arranged in the required pattern in the first receptacle 21.

Examples of suitable solid and liquid filtering materials include aerosol filters, selective sorbents, chemical absorbents and other substances, including the substance being preserved, which effect chemical reaction, electrostatic, mechanical and other types of sorption, filtration, extraction and purification from impurities until the impurity content in the outside medium entering the working space of the vessel is less than or equal to that of the substance being stored in the vessel.

The shut-off filtering device of the present invention makes it possible to determine the pressure inside the vessel with respect to the outside medium by the position of the liquid sorbent 5 in the chambers of the other receptacle 12 and the direction of movement of gases and vapors passing through the bubbling stage.

Figure 2:
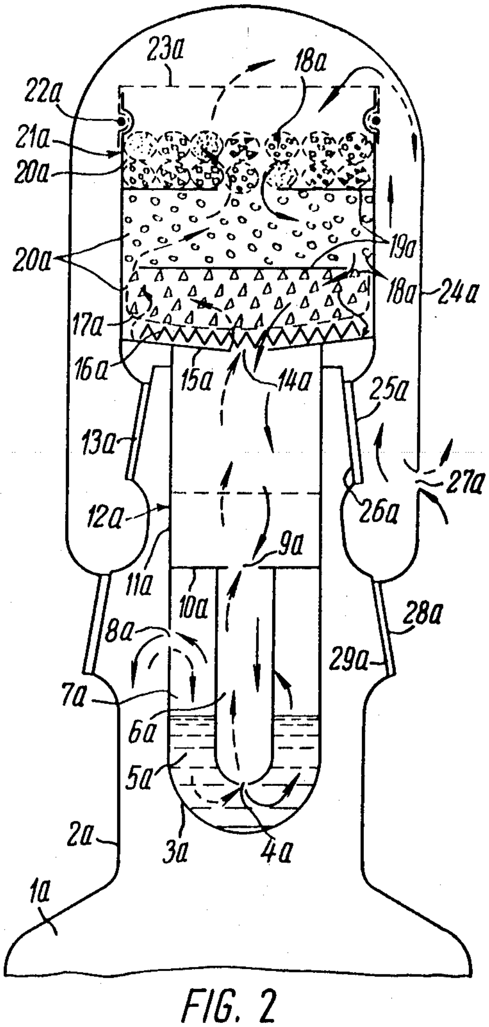
FIG. 2 illustrates the shut-off filtering device to be used in vessels adapted for storing and transporting high-purity substances, said device being arranged outside the vessel, while a receptacle filled with filtering and sorbing materials is placed above a receptacle filled with a liquid sorbent.

Shown in FIG. 2 is a shut-off filtering device disposed outside the vessel 1*a* and joined thereto with the aid of ground surfaces. This latter device differs from the device shown in FIG. 1 by that it is installed on the neck 2*a* of the vessel 1*a*, provided with two cones having ground surfaces, 26*a* and 29*a*, of smaller and greater diameter, respectively; the first receptacle 21*a* terminates below a partition 15*a* with a ground coupling 25*a* set on a ground cone 26*a* which above the neck 2*a* of the vessel 1*a*; on a greater ground cone 29*a* there is set a protective cap 24*a* with a ground coupling 28*a* and opening 27*a* through which circulate the outside medium entering the vessel 1*a* through the shut-off device and decontaminated gases leaving said vessel.

Following is the operational procedure of the shut-off filtering device according to the present invention.

When the pressure inside the vessel 1*a* is reduced, the ouside medium enters via the opening 27*a* in the protective cap 24*a* onto filtering materials 23*a* where it is purified from mechanical impurities and sols (the movement of said medium shown by arrow). Then, the outside medium passes in the radial direction from the center to the periphery and back (for a fuller utilization of the sorbents) through sections 20A of the first receptacle 21*a*, which are separated from each other by means of the partitions 19*a* and are filled with the sorbing materials 18*a*, where it is purified from chemical and mechanical impurities.

After having passed the filtering materials 17*a*, which prevent the traces of the sorbing materials 18*a* from leaving said first receptacle 21*a*, the outside medium passes into the other receptacle 12*a*, where it forces liquid sorbent 5*a* from the first chamber 11*a* into the chamber 7*a* via the overflow means, bubbles through said liquid sorbent, is washed from traces of impurities and, via opening 8*a*, enters the interior of the vessel 1*a*.

When the pressure inside the vessel 1*a* exceeds that of the outside medium, gas-vapor mixture (the movement of gas-vapor mixture shown by broken arrow) enters via the opening 8*a* of the chamber 7*a*, the other receptacle 12*a* and forces the liquid sorbent 5*a* via the overflow means 6*a* into the first chamber 11*a* (the position of said liquid sorbent 5*a* in the chamber 11*a* shown by broken line). Reacting with the liquid sorbent 5*a* and with sorbing materials 18*a* in the first receptacle 21*a*, decontaminated gases are let out into the environment through the filtering materials 23*a* and the opening 27*a* in the protective cap 24*a*.

Shown in FIGS. 3, 4, 7, 10, 12, 13, 16, 19, 21, 22, 23, 26, 29, 31, 32, 35 and 38 are shut-off filtering devices, according to the present invention, to be arranged inside the vessel together with attachments adapted for storing and transporting high-purity substances (FIGS. 3, 12, 21, 22, 31), for flushing the internal surface of the vessel 1*b, e, h,* and *l* (FIGS. 4, 13, 23, 32), for filling the vessel 1*b, e, h* and *l* with a high-purity substance (FIGS. 7, 16, 26, 35) and for removing from the vessel 1*b, e, h* and *l* and using said high-purity substance (FIGS. 10, 19, 29, 38) without impairing the purity thereof.

Figures 7, 8, 9:
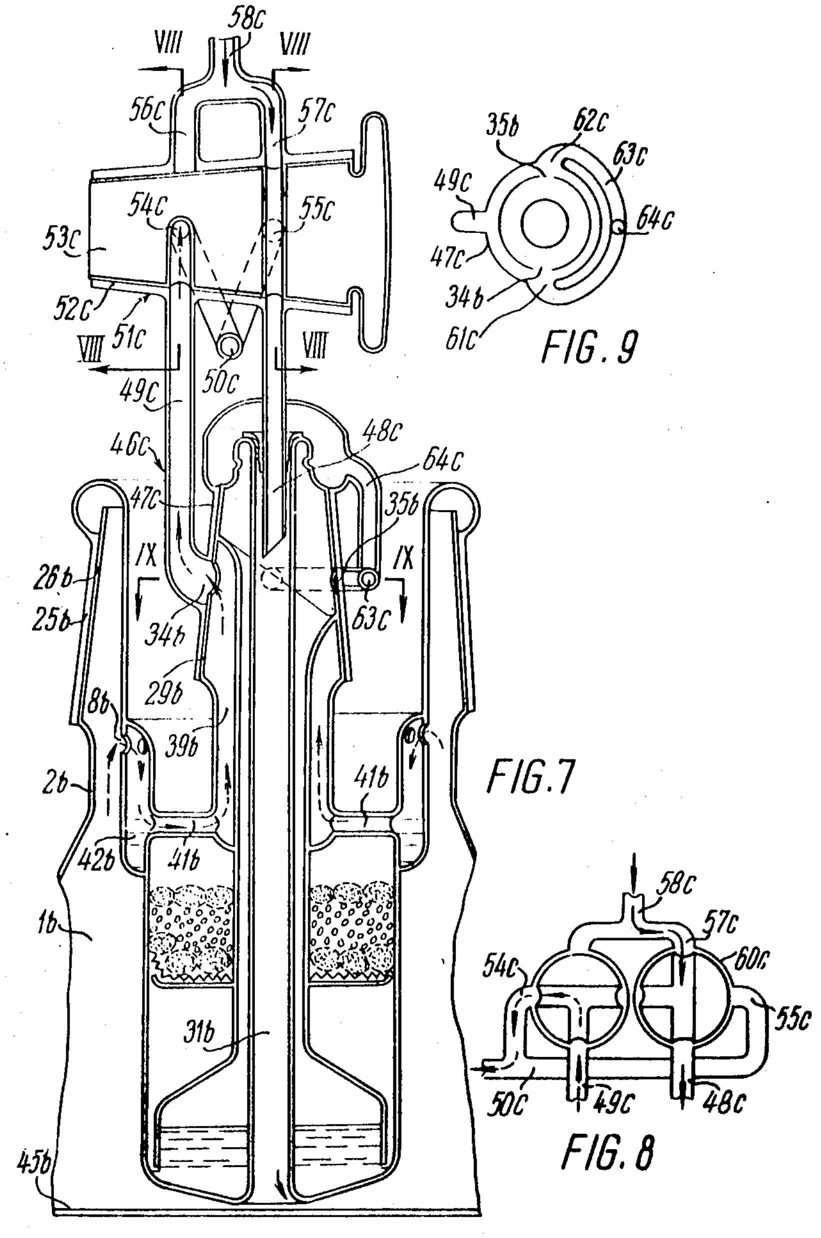
FIG. 7 illustrates the shut-off filtering device, as shown in FIG. 5, conduits of the attachment cock being in a position ready for filling the vessel with a high-purity substance.
FIG. 8 shows two sections IX—IX, made by parallel planes in FIG. 7, conventionally turned through 90°.
FIG. 9 shows a section on the line VIII—VIII of FIG. 7.
Figures 10, 11:
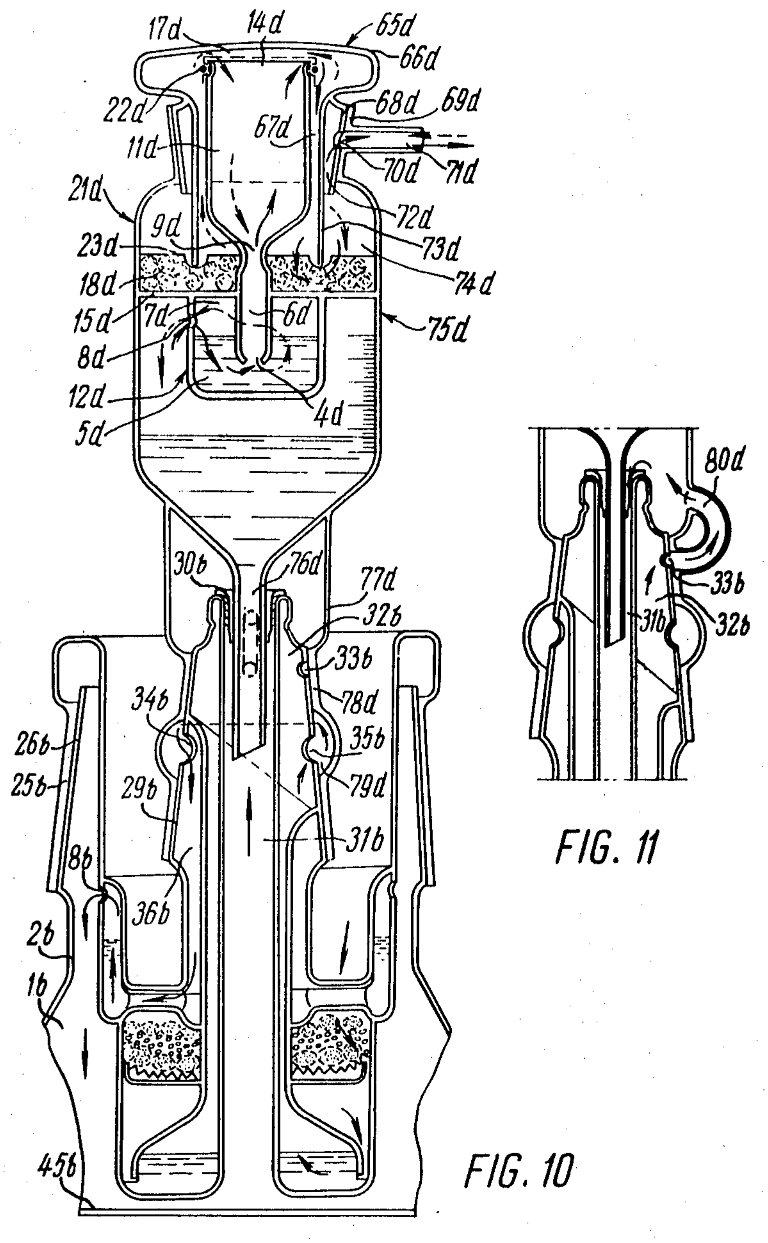
FIG. 10 illustrates the shut-off filtering device, as shown in FIG. 3, on which there is fitted an attachment adapted for removing the high-purity substance from the vessel into a burette.
FIG. 11 shows the position of the burette and conduits of the shut-off filtering device, as shown in FIG. 3, following the removal of the high-purity substance from the vessel.

Since the shut-off filtering devices designed for storing and transporting (FIG. 3), flushing and filling (FIGS. 4, 7) removing and using (FIG. 10) high-purity substances differ from each other by attachments alone (24*b*, 46*c*, and 65*d*), only a detailed description of the shut-off filtering device according to (FIG. 3) is presented herein. With reference to FIGS. 4, 7 and 10, only the operation of those parts of the present shut-off filtering device is described in detail, which take part in the operation of particular attachments.

On the other hand, the shut-off filtering devices, as shown in FIGS. 3, 12, 21, 22 and 31, in FIGS. 4, 13, 23, and 32, in FIGS. 7, 16, 26 and 35, and in FIGS. 10, 19, 29 and 38, are different for each group of figures, however, for performing similar operations the same attachments are used. Therefore, the descriptions of separae attachments are not repeated, although they are defined by different reference numerals.

The shut-off filtering device (FIG. 3) is set by means of a coupling 25*b* on a ground cone 26*b* which is above the neck 2*b* of the vessel 1*b*. Said device consists of an upper body 37*b* and lower body 43*b*. The coupling 25*b* is connected to the upper body 37*b* having along the circumference thereof openings 8*b*. In turn, the upper body 37*b* is overlappingly joined (forming an effective clearance 42*b*) to the lower body 43*b* havin ga bottom 3*b* which does not touch a bottom 45*b* of the vessel 1*b*, and a central connecting sleeve 38*b* in the form of a central pipe 31*b* hermetically sealed by a plug 30*b*, and a ground cone 29*b*.

Coaxial with the central pipe 31*b* in the body of the shut-off filtering device there is installed an auxiliary pipe 40*b*, whose lower end terminates with a partition 10 and an overflow means 6*b* (in the form of a cap) forming with the lower body 43*b* and its bottom 3*b* clearances, 9*b* and 4*b*, respectively.

The space under the cap 6*b* forms the chamber 7*b* of second receptacle 12*b*, filled with the liquid sorbent 5*b*. Secured to the auxiliary pipe 40*b* above the partition 10*b* is a horizontal partition 15*b* which forms with the lower body 43*b* a minimal clearance 14*b*.

The space defined by the lower body 43*b*, partition 10*b* of the overflow means 6*b* and the partition 15*b* forms the first chamber 11*b* of said second receptacle 12*b*. The volume of the first chamber 11*b* should not be smaller than that the chamber 7*b*.

The space above the horizontal partition 15*b,* defined by the lower body 43*b* and connected to the environment via the upper body 37*b,* forms the first receptacle 21*b* successively filled with bags made from filtering materials 17*b* and containing sorbing materials 18*b,* tightly fitting the lower body 43*b* of the shut-off filtering device.

To the upper end of the central pipe 31*b* of the connecting sleeve 38*b* there is connected the ground cone 29*b* of the latter connecting sleeve, connected to the auxiliary pipe 40*b*. The upper end of the auxiliary pipe 40*b* is joined to the inner side of the ground cone 29*b* and divides the space defined by said latter cone and the central pip 31*b* into two auxiliary chambers; the first, 32*b*, and the second, 36*b*. The first auxiliary chamber 32*b* communicates with the environment through openings 33*b* and 35*b*; and the second auxiliary chamber 36*b*—through an opening 34*b*.

A circular clearance 39*b* defined by the auxiliary pipe 40*b* and cone 29*b* with a pipe union is communicated by means of at least two pipes 41*b* with the circular clearance 42*b* and, via openings 8*b*—with the interior of the vessel 1*b*.

The hydraulic seal, formed by the pipes 41*b,* circular clearances 39*b* and 42*b* and the liquid sorbent 5*b,* prevents the high-purity substance in the vessel from immediate contact with the outer medium via the openings 33*b*, 34*b* and 35*b*.

For the purposes of storing and transporting the high-purity substance in the vessel 1*b* without impairing the quality of said substance, the central pipe 31*b* is sealed hermetically by means of the plug 30*b*; then, a cap 24*b* with a coupling 28*b* is set on the ground cone 29*b*, thereby providing for the intercommunication of the auxiliary chambers 32*b* and 36*b* via the openings 33*b*, 34*b* and 35*b*, as well as for the isolation of said auxiliary chambers from the outside medium.

When the pressure inside the vessel 1*b* is reduced, the outside medium enters, via the circular space defined by the upper body 37*b* and the cap 24*b*, the first receptacle 21*b* (the movement of the outside medium shown by arrow), and filters through the bags of the filtering materials 17*b* filled with the sorbing materials 18*b*, wherein said outside medium is purified from mechanical and chemical impurities. Then, the outside medium passes through the clearance 14*b* into the first chamber 11*b* of the other receptacle 12*b*, forces the liquid sorbent 5*b* via the overflow means 6*b* into the last chamber 7*b* of the other receptacle 12*b*, is flushed free of the reacts of impurities in the process of bubbling, and passes up through a circular clearance 44*b* into the first auxiliary chamber 32*b*. After having left the latter chamber through the openings 33*b* and 35*b* and passed under the cap 24*b* through the opening 34*b* into the second auxiliary chamber 36*b*, the purified outside medium forces the liquid sorbent 5*b* from the circular clearance 39*b* and pipes 41*b* into the circular clearance 42*b* and, via the openings 8*b*, enters the interior of the vessel 1*b*, thus balancing the inside pressure with that of the outside meduim.

Upon the increase of pressure inside the vessel 1*b* the gas-vapor mixture travels the above-described path in the reverse sequence (the movement of the gas-vapor mixture shown by broken arrow), that is, the gas-vapor mixture enters via the openings 8*b* the circular clearance 42*b*, and forces the liquid sorbent 5*b* via the pipes 41*b* into the circular clearance 39*b*; bubbling through the liquid sorbent 5*b*, the gas-vapor mixture goes into the secondary auxiliary chamber 36*b* and leaves the latter via the opening 34*b* for the cap 24*b*; thereupon, the mixture enters via the opening 35*b* the first auxiliary chamber 32*b*, passes down through the circular clearance 44*b* into the chamber 7*b*, forces the liquid sorbent 5*b* from the latter chamber 7*b* into the first chamber 11*b* of the second receptacle 12*b* (the position of the liquid sorbent 5*b* in the chamber 11*b* shown by broken line), and bubbles through said liquid sorbent; reacting with the liquid sorbent 5*b*, sorbing materials 18*b* and filtering materials 17*b*, disposed in the first receptacle 21*b*, decontaminated gases leave into the outside medium, thus balancing the pressure on both sides of the walls of the vessel 1*b*.

Figure 3:
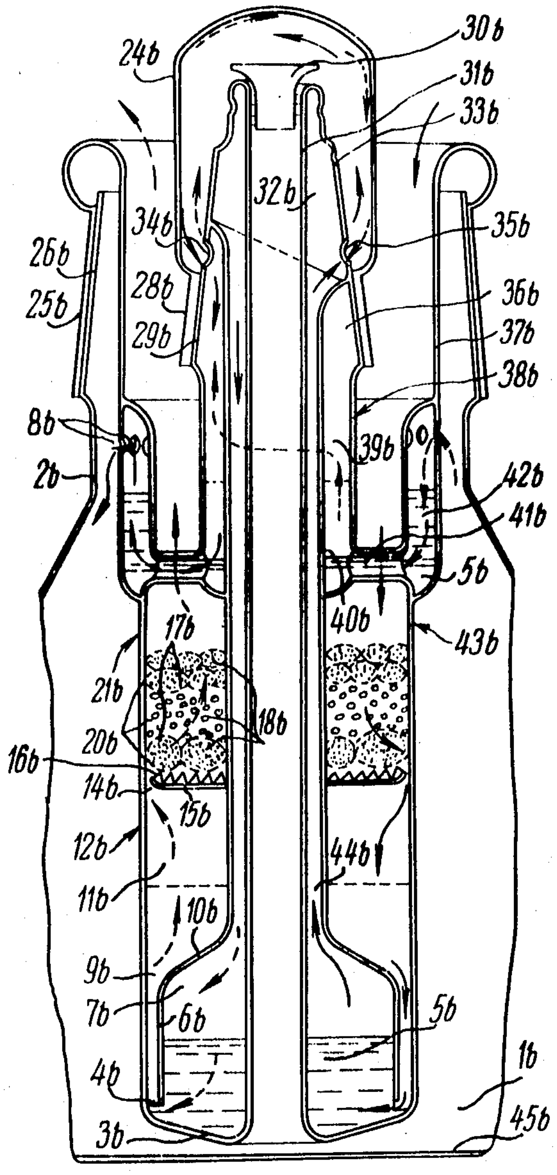
FIG. 3 illustrates the shut-off filtering device to be used in vessels adapted for storing and transporting high-purity substances, said device being arranged inside the vessel, while the receptacle filled with filtering and sorbing materials is placed above the receptacle filled with a liquid sorbent.
Figures 4, 5, 6:
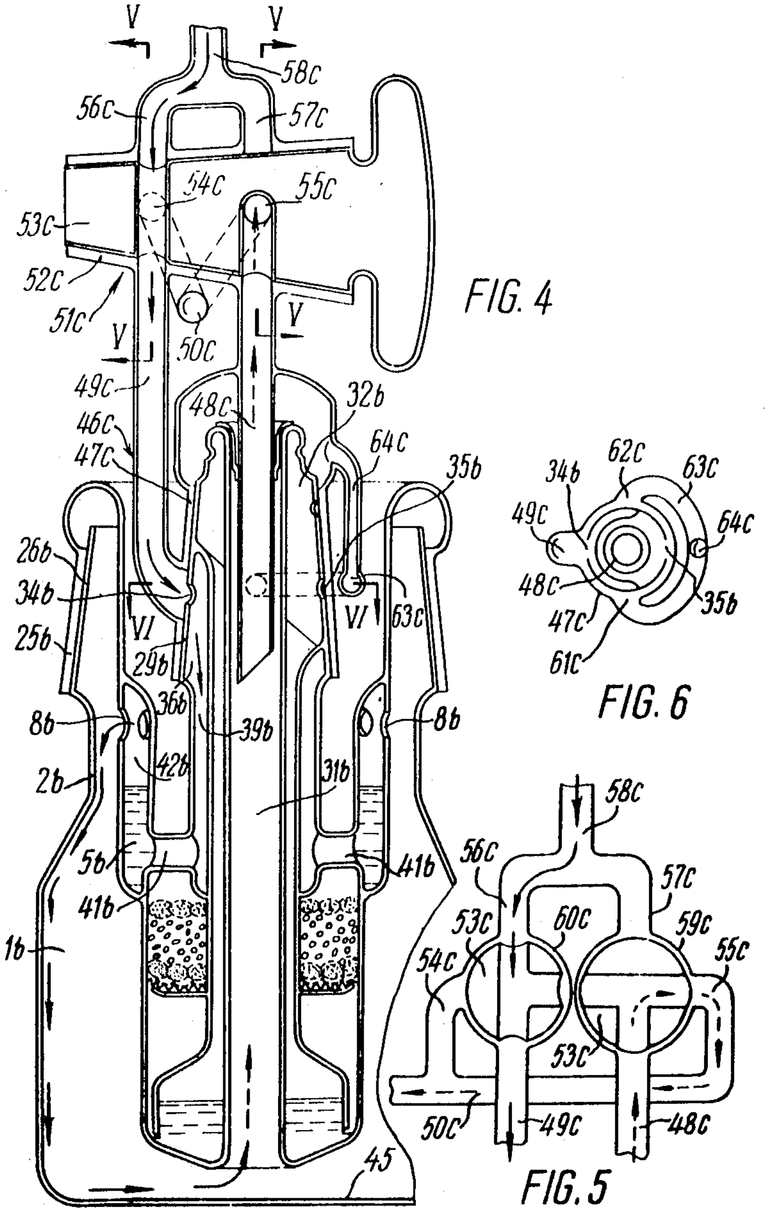
FIG. 4 illustrates the shut-off filtering device, as shown in FIG. 3, on which there is fitted an attachment adapted for flushing the internal surface of the vessel with a high-purity substance.
FIG. 5 shows two sections V—V, defined by parallel planes in FIG. 4, conventionally turned through 90°.
FIG. 6 shows a section on the line VI—VI of FIG. 4 (the position of openings of the shut-off filtering device after the vessel has been filled with a high-purity substance)

FIG. 4 illustrates the shut-off filtering device, as shown in FIG. 3, on which there is fitted (in the position shown in FIG. 5) an arrangement 46*c* adapted for flushing with a high-purity substance the internal surface of the vessel 1*b*.

The attachment 46*c* is essentially a cock 51*c* connected to a coupling 47*c* adapted to be set on the ground cone 29*b* of the shut-off filtering device of the vessel 1*b*. The cock 51*c*, including a body 52*c* and a plug 53*c*, combines two three-way cocks 59*c* and 60*c* (FIG. 5). The body 52*c* of the cock 51*c* is provided with six conduits: the first conduit 49*c* communicates the body 52*c* with the coupling 47*c* on a level with the opening 34*b* of the cone 29*b*; the second conduit 48*c*, communicating the body 52*c* of the cock 51*c* with the coupling 47*c*, enters the central pipe 31*b* of the shut-off filtering device. Arranged on the body 52*c*, diametrically opposite relative to the conduits 48*c* and 49*c* and on the same axis with the latter conduits, are the third conduit 56*c* and the fourth, 57*c*, which are interconnected by means of a manifold 58*c* adapted for supplying the high-purity substance. The fifth conduit 54*c* is arranged normal to the axis of the conduits (pipes) 49*c* and 56*c* of the cock 60*c*, while the sixth conduit 55*c* is arranged normal to the axis of the conduits (pipes) 48*c* and 57*c* of the cock 59*c* on the side opposite relative to the conduit 54*c*. The conduits 54*c* and 55*c* are interconnected by means of a manifold 50*c* adapted for removing the gas-vapor mixture and gas-vapor-liquid emulsion.

The coupling 47*c* is provided with two openings, 61*c* and 62*c* (FIG. 6). These latter openings are connected by means of a conduit 63*c* to each other and to a conduit 64*c* which serves to communicate the conduit 63*c* with the interior of the central pipe 31*b* (FIG. 4).

When the openings 61*c* and 62*c* coincide with the openings 34*b* and 35*b*, the purified outside medium passes inside the vessel 1*b* and the central pipe 31*b* via the conduits 63*c* and 64*c*, the inside pressure being balanced with that of the outside medium.

When flushing the internal surface of the vessel 1*b*, the plug 53*c* of the cock 51*c* is shifted to the position as in FIG. 5, which shows two sections V—V of the cock 51*c*, defined by two parallel planes in FIG. 4, conventionally turned through 90°. When so doing, the openings 34*b* and 35*b* are in the position as shown in FIG. 6. In this position, the high-purity substance via the manifold 58*c*, conduit 56*c*, plug 53*c*, conduit 49*c* and the opening 34*b* goes into the circular clearance 39*b* (the movement of the high-purity substance shown in FIGS. 4 and 5 by arrow). From here, the high-purity substance passes via the pipes 41*b* into the circular clearance 42*b*, is poured via the openings 8*b* onto the neck 2*b* of the vessel 1*b*, are spread throughout the internal surface of the vessel 1*b* thus flushing the same. As the substance accumulates on the bottom 45*b* of the vessel 1*b*, it is sucked in the form of a gas-vapor-liquid emulsion along the central pipe 31*b* into the conduit 48*c* and, via the conduit in the plug 53*c* of the cock 51*c*, and the conduit 55*c*, enters the manifold 50*c* (the movement of the emulsion shown in FIGS. 4 and 5 by broken arrow).

In order to remove the vessel 1*b* after flushing the internal surface thereof, the cock 51*c* is cut off the conduits 48*c*, 49*c* and 56*c*, 57*c*; the attachment 46*c* is set into position as shown in FIG. 9. As a result, the outside medium purified in accordance with the technique disclosed in the description of FIG. 1 passes inside the central pipe 31*b* and the vessel 1*b* via the openings 34*b*, 35*b*, 61*c* and 62*c*, the conduits 63*c* and 64*c*, thus balancing the inside pressure with that of the outside medium.

FIG. 7 illustrates the shut-off filtering device on which there is fitted (in the position shown in FIG. 8) the attachment 46*c* adapted for filling the vessel 1*b* with a high-purity substance.

Since the only difference of the flushing process from the filling one resides in the position of the conduits in the plug 53c of the cock 51c (FIG. 8), all the reference numerals in FIGS. 4, 5 and 6 remain completely the same for defining the respective positions in FIGS. 7, 8 and 9.

For filling the vessel 1b with a high-purity substance, the plug 53c of the cock 51c is shifted, by turning it through 90°, into position as in FIG. 8. FIG. 8 shows two sections VIII—VIII of the cock 51c, defined by parallel planes in FIG. 7, conventionally turned through 90°. The openings 34b and 35b are, at the same time, in the position shown in FIGS. 4, 6 and 7.

In this position, the high-purity substance via the manifold 58c, conduit 57c, conduit of the plug 53c and conduit 48c goes along the central pipe 31b into the working space of the vessel 1b, thus filling the latter (the movement of the high-purity substance shown in FIGS. 7 and 8 by arrow).

Air and vapors are sucked from the vessel 1b through the openings 8b, circular clearance 42b, pipes 41b, circular clearance 39b, via the opening 34b, along the conduit 49c, conduit in the plug 53c of the cock 51c and conduit 54c into the manifold 50c (the movement of gases and vapors shown in FIGS. 7 and 8 by broken arrow).

After filling the vessel 1b with the high-purity substance, the pressure inside the central pipe 31b and vessel 1b should be balanced with that of the outside medium. To this end, the cock 51d is cut off the conduits 48c, 49c and 50c, 57c; the ground cone 29b (or coupling 47c) is turned through 90° until the openings 34b and 35b of the cone 29b coincide with those 61c and 62c of the coupling 47c (FIG. 9, section on the line IX—IX). As a result, the outside medium purified in accordance with the technique disclosed in the description of FIG. 1 passes inside the central pipe 31b and vessel 1b via the openings 34b, 35b, 61c, and 62c, the conduits 63c and 64c, thus balancing the inside pressure with that of the outside medium.

FIG. 10 illustrates the shut-off filtering device, as shown in FIG. 3, on which there is fitted an attachment 65d adapted for removing the high-purity substance from the vessel 1b into a burette 75d.

The attachment 65d is essentially a calibrated burette 75d, whose spout 76d is disposed inside a pipe union 77d connected with a coupling 78d, said latter coupling being ground to fit the surface of the cone 29b and having on a level with the openings 34b and 35b a connecting circular space 79d. Thus, the interior of the central pipe 31b is isolated from the outside medium, whereas the interior of the vessel 1b communicates with the outside medium via the shut-off filtering device. Connected with the coupling 78d on a level with the opening 33b is a conduit 80d (FIG. 11), which connects the first auxiliary chamber 32b with the interior of the central pipe 31b when the attachment 65d is turned through 90°.

The upper portion of the burette 75d is essentially a shut-off filtering means separated from the interior of the burette by means of a horizontal partition 15d, to which there is connected a bottom chamber 7d of a second receptacle 12d, having an opening 8d serving to communicate the interior of the burette 75d with the last chamber 7d.

In the center of the partition 15d there is mounted an overflow means 6d which intercommunicates via openings 9d and 4d a first chamber 11d and the last chamber 7d of the second receptacle 12d of said shut-off filtering means. The bottom end of the overflow means 6d is lowered to the bottom of the last chamber 7d without touching said bottom.

The top end of the first chamber 11d of the second receptacle 12d terminates with a funnel 14d closed by filtering materials 17d kept in place with the aid of a bracing 22d.

Connected to the burette above the partition 15d is a first receptacle 21d terminating with a ground coupling 69d provided with a pipe 71d which communicates the burette 75d with the environment or with a vacuum line. To the first receptacle are poured sorbing materials 18d covered with filtering materials 23d.

The coupling 69d receives a ground cone 68d having an opening 70d and handle 66d. To the latter handle there is joined, coaxial with the cone 68d, a cylinder 73d adapted to be pressed into the filtering materials 23d and sorbing materials 18d as well as to preclude direct communication of the second receptacle 12d with the outside medium.

In order to remove from the vessel 1b the high-purity substance, the burette 75d together with the ground coupling 78d connected thereto is set onto the ground cone 29b of the shut-off filtering device of the vessel 1b. When so doing, the spout 76d of the burette 75d pierces the plug 30b and is received by the central pipe 31b of the shut-off filtering device of the vessel 1b. Thereupon, a vacuum line is connected to the pipe 71d, and there takes place the evacuation of the interior space of the burette 75d and of the central pipe 31b of the shut-off filtering device of the vessel 1b through the shut-off filtering means of the burette 75d. As a result, the outside medium purified in the shut-off filtering device of the vessel 1b in a manner described hereinabove (cf. description of FIG. 3), after having passed inside the vessel through the openings 8b, forces the contents of the vessel 1b through the central pipe 31b into the burette 75d (the movement of gases and vapors shown in FIG. 10 by arrow).

Gases and vapors from the central pipe 31b and burette 75d via the opening 8d pass into the last chamber 7d of the shut-off filtering means of the burette 75d and force the liquid sorbent 5d via the overflow means 6d into the first chamber 11d.

In the process of contacting the liquid sorbent 5d, filtering materials 17d and 23d, and sorbing materials 18d, the gases and vapors are decontaminated and, via the opening 70d in the ground cone 68d and coupling 69d and along the pipe 71d, are sucked out into the vacuum system.

After the burette 75d is filled, the opening in the coupling 69d is closed with the surface of the cone 68d by turning the handle 66d.

For removing the burette 75d from the cone 29b of the shut-off filtering device of the vessel 1b, said burette is turned through 90° until the opening 33b on the cone 29b is aligned with the conduit 80d in the coupling 78d (FIG. 11); at the same time, the interior spaces of the pipe union 77d of the burette 75d and of the central pipe 31b of the shut-off filtering device are filled with purified outside medium supplied from the first auxiliary chamber 32b through the opening 33b in the cone 29b of the shut-off filtering device of the vessel 1b until the inside pressure is balanced with that of the outside medium (the movement of the purified outside medium shown in FIG. 11 by arrow).

When emptying the burette 75d for the purpose of using the high-purity substance, the opening 70d in the cone 68d is aligned with that in the coupling 69d. When so doing, the outside medium (its movement shown by broken arrow) along the pipe 71d passes through a circular clearance 72d into the first receptacle 21d of the shut-off filtering device, and filters through the filtering materials 23d and sorbing materials 18d in its way down on the outer side of the cylinder 73d and then up on the inner side of the cylinder 73d, being purified from mechanical and chemical impurities.

Passing up a circular clearance 67d towards the top funnel 14d of the first chamber 11d of the second receptacle 12d, the purified outside medium forces the liquid sorbent through the opening 9d, overflow means 6d and opening 4d into the last chamber 7d (the position of the liquid sorbent shown by broken line), is purified from the traces of impurities in the course of bubbling and, via the openings 8d, passes inside the burette 75d, balancing the pressure inside the latter with that of the outside medium. Thereupon, the high-purity substance is fed under static pressure through the spout 76*d* for being used.

Figure 12:
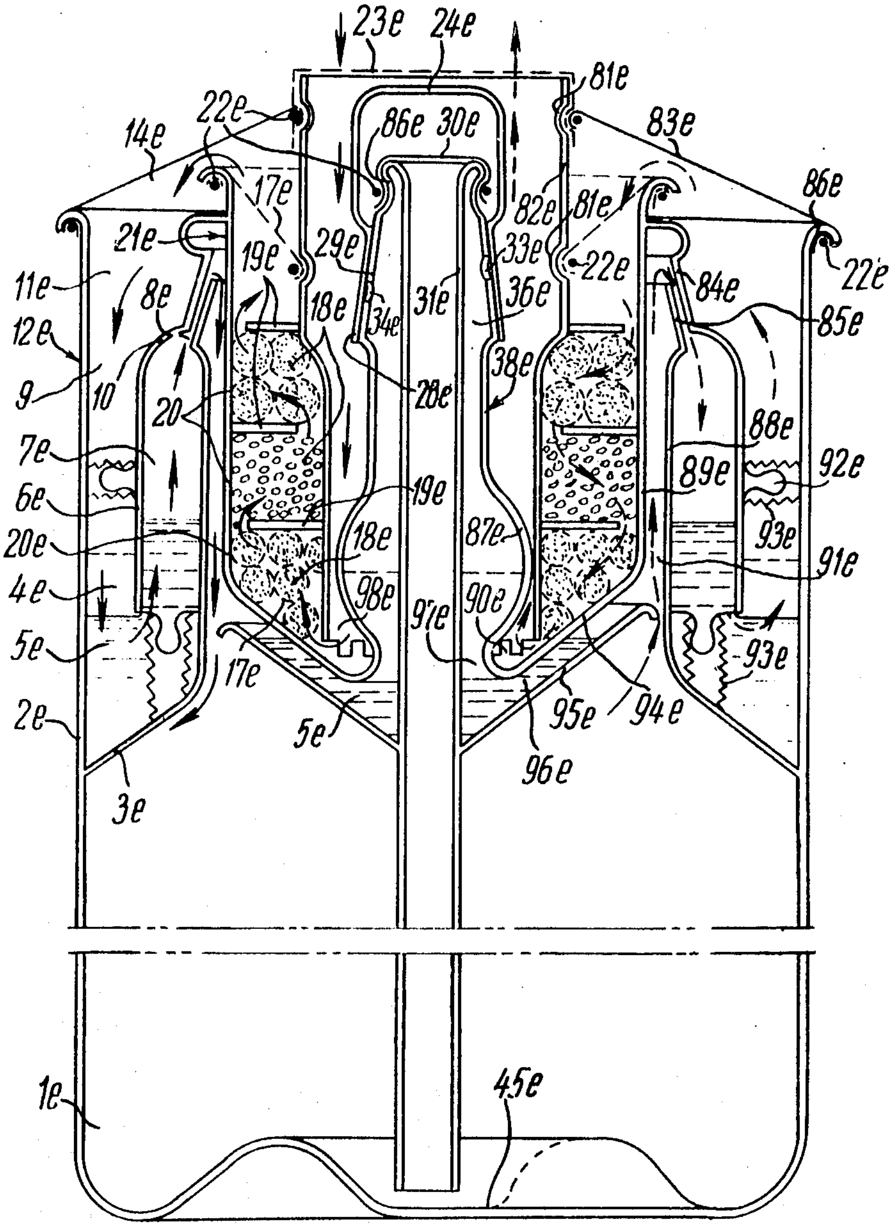
FIG. 12 illustrates the shut-off filtering device, wherein sections of the first receptacle filled with filtering and sorbing materials are arranged coaxial with chambers of the other receptacle in which the liquid sorbent flows over, the device proper being disposed inside the neck of the vessel and designed for storing and transporting a high-purity substance.

FIG. 12 illustrates the shut-off filtering device disposed inside the neck 2*e* of the vessel 1*e*, wherein sections 20*e* of the first receptacle 21*e* filled with filtering materials 17*e* and 23*e* and sorbing materials 18*e* are arranged coaxial with chambers 7*e* and 11*e* of the other receptacle 12*e*, in which the liquid sorbent 5*e* flows over. The top end of the neck 2*e* of the vessel 1e has flanged edges 86*e* and a connecting sleeve 88*e* which terminates at its top with a ground conical surface 85*e*, while its lower end is provided with a bottom 3*e* connected to the body of the vessel 1*e*. The circular space defined by the neck 2*e* and the connecting sleeve 88*e* forms the second receptacle 12*e* of the shut-off filtering device. Mounted on shock absorbers 93*e* on the bottom 3*e* of the connecting sleeve 88*e* is the first receptacle 21*e* of the shut-off filtering device. This latter receptacle is essentially a sleeve 89*e* having flanged edges and a conical bottom 94*e* to which there is connected a central connecting sleeve 38*e* in the form of an expander 87*e*, a ground cone 29*e* connected thereto and having openings 33*e* and 34*e*, and a cetral pipe 31*e* lowered to the bottom 45*e* of the vessel 1*e* without touchig said bottom. The cone 29*e* has an elongated end with the flanged edges 86*e* over which there is pulled a film 30*e* secured by means of a thread 22*e*. The space defined by the central pipe 31*e*, cone 29*e* and the expander 87*e* forms a second auxiliary chamber 36*e*. Joined to the central pipe 31*e* is a cone-shaped plate 95*e* having flanged edges and adapted to receive the conical bottom 94*e* of the sleeve 89*e* of the first receptacle 21*e* of the shut-off filtering device to form a hydraulic seal with the liquid sorbent 5*e*, whereby there is precluded a direct communication of the outside medium with the interior of the vessel 1*e* through the openings 33*e* and 34*e* following the removal of a cap 24*e*. To the sleeve 89*e* there is joined an overflow means 6*e* in the form of a cylindrical collar terminating on top with a ground internal surface 84*e* (on the coupling) and having on the side surface and on the bottom end pins 92*e* (at least three pins) adapted for securing thereon the shock absorbers 93*e* resting against the bottom 3*e* of the connecting sleeve 88*e* and against the neck 2*e* of the vessel 1*e*. The cylindrical portion of the overflow means 6*e* serves to divide the second receptacle 12*e* into two chambers, the first 11*e* and the second 7*e*, in which chambers the liquid sorbent 5*e* flows over from chamber to chamber. Inside the sleeve 89*e* and coaxial with the central connecting sleeve 38*e* there is mounted a cylinder 82*e*. Into the circular space defined by the sleeve 89*e* and cylinder 82*e* are poured the sorbing materials 18*e* divided by means of partitions 19*e* into the sections 20*e*. The cylinder 82*e* is provided on the bottom with grooves 90*e*, and on top—with two circular recesses 81*e*, adapted to receive the thread 22*e* securing the inner ends of the filtering materials 17*e* and 23*e* and of a sealing film 83*e*. The outer ends of the filtering materials 17*e* and 23*e* are pulled and secured on the flanged edges of the sleeve 89*e* while the outer end of the sealing film 83*e* is tightly pulled over the flanged edges 86*e* of the neck 2*e* of the vessel 1*e* and secured thereon by means of the thread 22*e*.

For the purposes of storing and transporting the high-purity substance in the vessel 1*e* without impairing the quality of said substance, the central pipe 31*e* is hermetically sealed with the film 30*e* secured by means of the thread 22*e*; then, onto the ground cone 29*e* there is set the cap 24*e* with a ground coupling 28*e* isolating the openings 33*e* and 34*e* of the second auxiliary chamber 36*e* from the outside medium.

Following the reduction of pressure inside the vessel 1*e*, the outside medium (the direction of movement of the latter shown by arrow) passes through the filtering materials 23*e* to the interior of the cylinder 82*e* and is purified from mechanical impurities; having passed through a clearance 98*e* via the grooves 90*e*, the outside medium is purified from mechanical and chemical impurities by the sorbing materials 18*e*, disposed in the sections 20*e* of the first receptacle 21*e*, and then by the filtering materials 17*e*, whereupon said outside medium enters the second receptacle 12*e* in which it forces the liquid sorbent 5*e* via the overflow means 6*e* from the first chamber 11*e* into the chamber 7*e*. The purified outside medium, which in the course of bubbling through the liquid sorbent 5*e* has been washed from the traces of impurities, passes through a clearance 8*e* between a coupling 84*e* and the cone 85*e* and a clearance 91*e*, formed by the connecting sleeve 88*e* and the sleeve 89*e*, into the interior of the vessel 1*e*, whereby the pressure inside the latter is balanced with that of the outside medium.

In case the pressure inside the vessel 1e exceeds that of the outside medium, the gas-vapor mixture travels the above-described path in the reverse sequence (the movement of the gas-vapor mixture shown by broken arrow), that is, the gas-vapor mixture going up the clearance 91*e* enters through the clearance 8*e* the chamber 7*e* and forces the liquid sorbent 5*e* into the chamber 11*e* (the position of the liquid sorbent shown by broken line). Reacting with the liquid sorbent 5*e*, filtering materials 17*e*, sorbing materials 18*e*, decontaminated gases leave through the filtering materials 23*e* into the outside medium.

Figure 18:
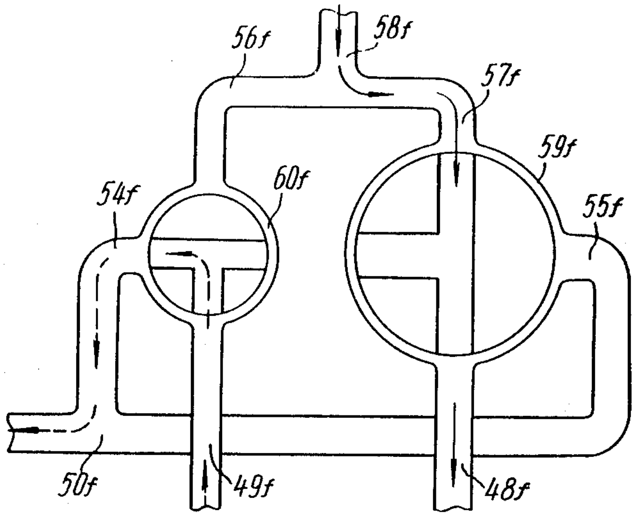
FIG. 18 shows two sections XVIII—XVIII, defined by parallel planes in FIG. 16, conventionally turned through 90.
Figures 16, 17:
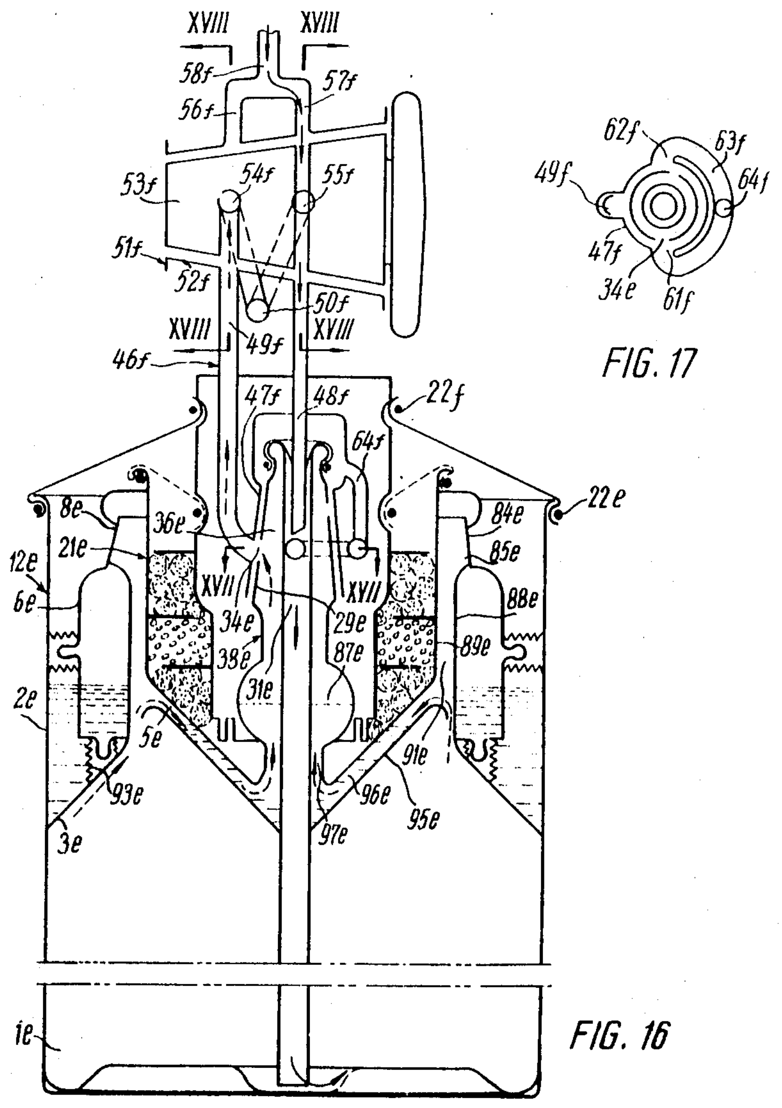
FIG. 16 illustrates the shut-off filtering device, as shown in FIG. 13, conduits of the attachment cock being in a position ready for filling the vessel with a high-purity substance.
FIG. 17 shows a section on the line XVII—XVII of FIG. 16.

FIGS. 13, 14, 15 and 16, 17, 18 illustrate the shut-off filtering device, as shown in FIG. 12, on which there is fitted an attachment 46*f* adapted for flushing the internal surface of the vessel 1*e* with a high-purity substance (FIGS. 13, 14 and 15) and for filling the vessel 1*e* with high-purity substance (FIGS. 16, 17 and 18).

The attachment 46*f* being essentially the attachment 46*c* described hereinabove in connection with FIGS. 4, 5, 6, 7, 8 and 9, presented hereinbelow is the description of only those elements of the attachment which take part in the operation of the shut-off filtering device when flushing and filling the vessel 1*e* with a high-purity substance.

For the purpose of flushing the internal surface of the vessel 1*e*, pressure is applied by means of the attachment 46*f* (or, on the contrary, by means of the vessel 1*e*) through the cone 29*e* of the central connecting sleeve 38*e* onto the shock absorber 93*e*, and the coupling 84*e* of the overflow means 6*e* is tightly fitted on the ground cone 85*e* of the connecting sleeve 88*e*. The attachment 46*f* being locked in this position, the interior of the vessel 1*e* is fully disconnected from the outside medium. Then, a plug 53*f* of a cock 51*f* is shifted to the position as in FIG. 14, which shows two sections XIV—XIV of the cock 51*f* defined by parallel planes in FIG. 13, conventionally turned through 90°. When so doing, the opening 34*e* is in the position shown in FIG. 15. In this position, the high-purity substance via manifold 58*f*, conduit 56*f*, plug 53*f*, conduit 49*f* and opening 34*e* goes into the second auxiliary chamber 36*e* whence, filling conduits 97*e* and 96*e* and a plate 95*e* the high-purity substance flows over the edges of said latter chamber onto the walls of the sleeve 89*e* and further, along the bottom 3*e* of the latter, onto the walls of the vessel 1*e* (the movement of the high-purity substance shown in FIGS. 13 and 14 by arrow).

Figures 13, 15:
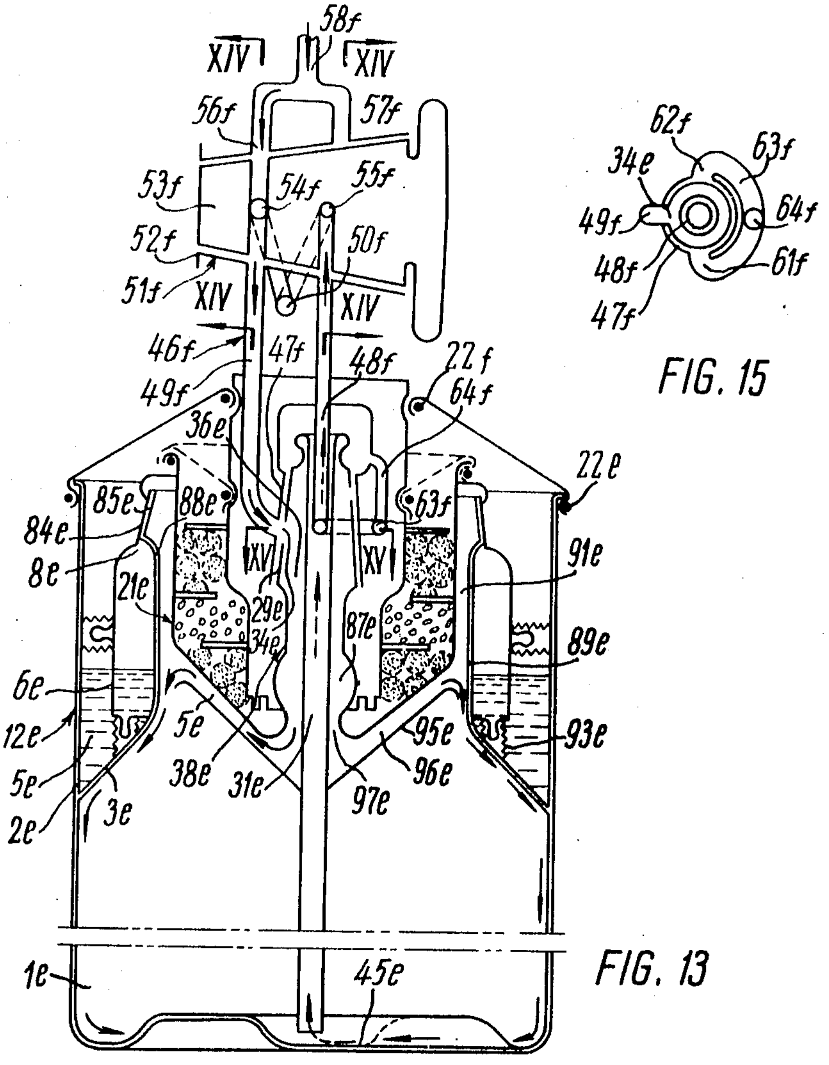
FIG. 13 illustrates the shut-off filtering device, as shown in FIG. 12, on which there is fitted an attachment adapted for flushing the internal surface of the vessel with a high-purity substance.
FIG. 15 shows a section on the line XV—XV of FIG. 13.
Figure 14:
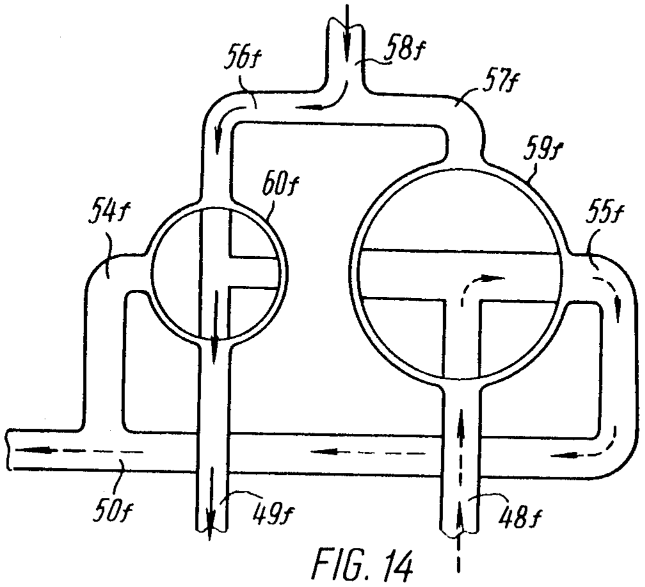
FIG. 14 shows two sections XIV—XIV, defined by parallel planes in FIG. 13, conventionally turned through 90°.

As the substance accumulates on the bottom 45*e* of the vessel 1*e*, it is sucked in the form of a gas-vapor-liquid emulsion along the central pipe 31*e* into a conduit 48*f* and, via the conduit in the plug 53*f* of the cock 51*f* and a conduit 55*f*, enters a manifold 50*f* (the movement of emulsion shown in FIGS. 13 and 14 by broken arrow).

FIG. 16 illustrates the shut-off filtering device according to FIG. 12, on which there is fitted (in the position shown in FIG. 18) the attachment 46*f* adapted for filling the vessel 1*e* with a high-purity substance.

Since the only difference of the flushing process from the filling one resides in the position of conduits in the plug 53*f* of the cock 51*f* with respect to conduits in a body 52*f* of said cock (FIG. 18), all the reference numerals in FIGS. 13, 14 and 15 remain completely the same for defining the respective positions in FIGS. 16, 17 and 18.

For filling the vessel 1*e* with a high-purity substance, the plug 53*f* of the cock 51*f* is shifted, by turning it through 90°, into position as shown in FIG. 18. FIG. 18 shows two sections XVIII—XVIII of the cock 51*f*, defined by parallel planes in FIG. 16, conventionally turned through 90°. The opening 34*e* is, at the same time, in the position as shown in FIGS. 13, 14, 15 and 16.

In this position, the high-purity substance via the manifold 58*f*, a conduit 57*f*, conduit of the plug 53*f* and conduit 48*f* passes along the central pipe 31*e* to the interior of the vessel 1*e*, thus filling the latter (the movement of the high-purity substance shown in FIGS. 16 and 18 by arrow).

Air and vapors are sucked from the vessel 1*e* through clearances 96*e* and 97*e*, opening 34*e*, along the conduit 49*f*, conduit in the plug 53*f* of the cock 51*f* and conduit 54*f* into the manifold 50*f* (the movement of gases and vapors shown in FIGS. 16 and 18 by broken arrow).

After filling the vessel 1*e* with the high-purity substance, the pressure inside the central pipe 31*e* and vessel 1*e* should be balance with that of the outside medium, for the purpose of removing the vessel 1*e*. To this end, the conduits 48*f*, 49*f*, 56*f* and 57*f* are closed from each other by means of the plug 53*f* of the cock 51*f*; the attachment 46*f* is released and, by being turned through 90°, is shifted to the position as shown in FIG. 17. The shock absorbers 93*e*, expanding, cause the communication of the first receptacle 21*e* with the overflow means 6*e*, disconnecting the coupling 84*e* from the cone 85*e* with a subsequent re-establishment of the clearance 8*e*. As a result, the outside medium purified in accordance with the technique disclosed in the description of FIG. 12 passes via the clearances 8*e* and 91*e* to the interior of the vessel 1*e*, and via the clearances 96*e* and 97*e* (forcing, at the same time, into the expander 87*e* the liquid sorbent 5*e*, whose position is shown in FIG. 16 by broken line), openings 34*e* and 61*f*, conducts 63*f*, 64*f* enters the interior of the central pipe 31*e*, thus balancing the pressure inside said vessel and central pipe with that of the outside medium.

Figure 19:
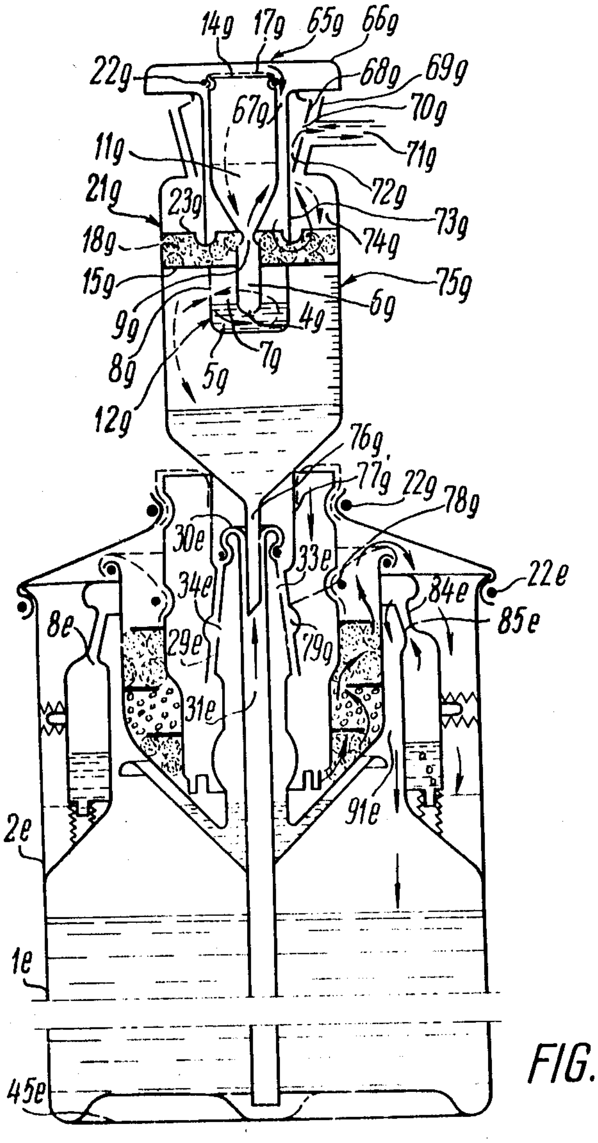
FIG. 19 illustrates the shut-off filtering device, as shown in FIG. 12, on which there is fitted an attachment adapted for removing the high-purity substance from the vessel into a burette.

FIG. 19 illustrates the shut-off filtering device, as shown in FIG. 12, on which there is fitted an attachment 65*g* adapted for removing the high-purity substance from the vessel 1*e* into a burette 75*g*.

Since the attachment 65*g* is essentially the attachment 65*d* described hereinabove in connection with FIGS. 10 and 11, presented hereinbelow is the description of only those elements of the attachment which take part in the operation of the shut-off filtering device when removing and using the high-purity substance.

In order to remove from the vessel 1*e* the high-purity substance, the burette 75*g* together with a ground coupling 78*g* connected thereto is set onto the ground cone 29*e* of the shut-off filtering device of the vessel 1*e*. When so doing, a spout 76*g* of the burette 75*g* pierces the film 30*e* and is received by the central pipe 31*e* of the shut-off filtering device of the vessel 1*e*. Thereupon, a vacuum line is connected to a pipe 71*g*, and there takes place the evacuation of the interior spaces of the burette 75*g* and of the central pipe 31*e* of the shut-off filtering device of the vessel 1*e* through a shut-off filtering means of the burette 75*g*. As a result, the outside medium purified in the shut-off filtering device of the vessel 1*e* in a manner described hereinabove (cf. description of FIG. 12), after having passed inside the vessel through the clearances 8*e* and 91*e*, forces the contents of the vessel 1*e* through the central pipe 31*e* into the burette 75*g* (the movement of gases and vapors shown in FIG. 19 by arrow).

Gases and vapors from the central pipe 31*e* and burette 78*g* via opening 8*g* pass into a chamber 7*g* of the shut-off filtering means of the burette 75*g* and force the liquid sorbent 5*g* via an overflow means 6*g* into a first chamber 11*g*. In the process of contacting the liquid sorbent 5*g*, filtering materials 17*g*, 23*g* and sorbing materials 18*g*, the gases and vapors are decontaminated and, via opening 70*g* in a ground cone 68*g* and coupling 69*g* and along the pipe 71g, are sucked out into the vacuum system.

After the burette 75*g* is filled, the opening in the coupling 69*g* is closed with the surface of the cone 69*g* by turning a handle 66*g*.

Figure 20:
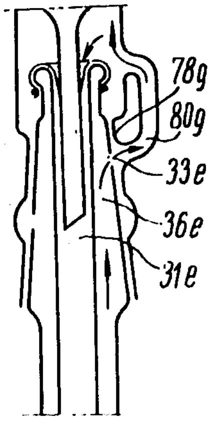
FIG. 20 shows the position of the burette and conduits of the shut-off filtering device, as shown in FIG. 19, following the removal of the high-purity substance from the vessel.

For removing the burette 75*g* from the cone 29*e* of the shut-off filtering device of the vessel 1*e*, said burette is turned through 90° until the opening 33*e* in the cone 29*e* is aligned with a conduit 80*g* in the coupling 78*g* (FIG. 20); at the same time, the interior spaces of a pipe union 77*g* of the burette 75*g* and of the central pipe 31*e* of the shut-off filtering device are filled with purified outside medium supplied from the second auxiliary chamber 36*e* through the opening 33*e* and condit 80*g* until the inside pressure is balanced with that of the outside medium (the movement of the purified outside medium shown in FIG. 20 by arrow).

When emptying the burette 75*g* for the purpose of using the high-purity substance, the opening 70*g* in the cone 68*g* is aligned with that in the coupling 69*g*. When so doing, the outside medium (its movement shown by broken line) passes along the pipe 71*g* and through a circular clearance 72*g* into a first receptacle 21*g* of the shut-off filtering means of the burette 75*g*, and filters through the filtering materials 23*g* and sorbing materials 18*g* in its way down on the outer side of a cylinder 73*g* and then up on the inner side of the cylinder 73*g*, being purified from mechanical and chemical impurities. Passing up through a circular clearance 67*g* towards a top funnel 14*g* of the first chamber 11*g* of the second receptacle 12*g*, the purified outside medium forces the liquid sorbent 5*g* through an opening 9*g*, overflow means 6*g* and opening 4*g* into the last chamber 7*g* (the position of the liquid sorbent shown by broken line), is purified from the traces of impurities in the course of bubbling and, via the opening 8*g*, passes inside the burette 75*g*, balancing the pressure inside the latter with that of the outside medium. The high-purity substance to be used is fed under static pressure through the spout 76*g*.

Figure 21:
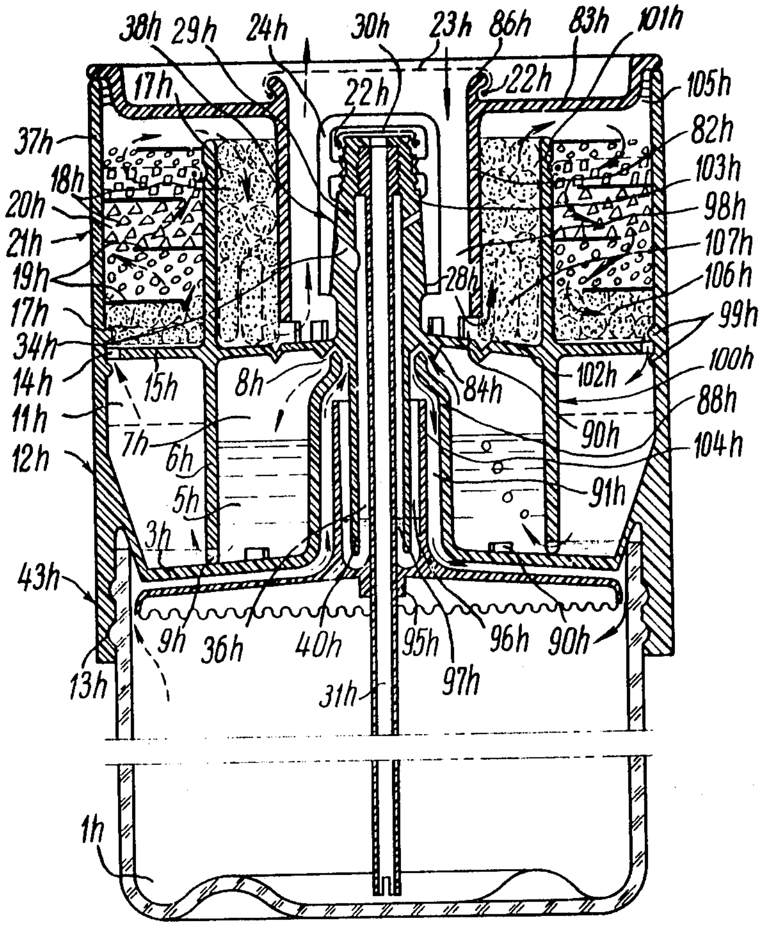
FIG. 21 illustrates the shut-off filtering device to be used in vessels adapted for storing and transporting high-purity substances, in which device the first receptacle filled with filtering and sorbing materials is placed above liquid-sorbent-containing chambers of the other receptacle arranged in coaxial relation to each other.

FIG. 21 illustrates the shut-off filtering device of the vessel 1*h*, wherein a first receptacle 21*h* filled with filtering and sorbing materials is placed above a second receptacle 12*h*, chambers 7*h* and 11*h* of said second receptacle 12*h* being arranged in coaxial relation to each other.

Figure 22:
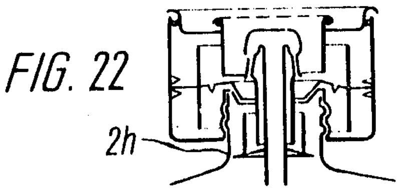
FIG. 22 shows diagrammatically the shut-off filtering device according to FIG. 21, wherein the lower body of said device is joined to the neck of the vessel.

The shut-off filtering device consists of an upper body 37*h* and lower body 43*h*, separated from each other by means of ridges 99*h*. The lower body 43*h* having a bottom 3*h* and a connecting sleeves 88*h* can be joined by a union 13*h* directly to the vessel 1*h* or to the neck 2*h* thereof, as shown in FIG. 22, or it can be made integral with the upper body 37*h* and constitute a single unit with the vessel 1h.

The body of the shut-off device is adapted to receive a shaped part 100 which is essentially a cylinder 101*h* with recesses 90*h* at the base and an outer partition 15*h* in the form of a rack with openings 14*h* adapted to be inserted into the ridges 99h and an inner partition 102*h*. In the center of the inner partition 102*h* there is provided a central connecting sleeve 38*h* in the form of a ground cone 29*h* with an opening 34*h* and an elongated end 103*h* threaded inside and outside, to which end there is hermetically joined from the inside a central pipe 31*h*, a ground cap 24*h* being screwed on said end from the outside.

Coaxial with the connecting sleeve 88*h* and above it on the inner partition 102*h* of the part 100*h* there is provided a circular sealing groove formed by a projection 84*h* on said part 100*h*, a circular sealing projection of the connecting sleeve 88*h* and an auxiliary pipe 41*h*.

To the central pipe 31*h* there is hermetically joined a leaf-type distributor 95*h* with a pipe 104*h*, forming together with the pipes 31*h* and 41*h* a hydraulic seal which precludes a direct communication of the high-purity substance with the outside medium through the opening 34*h* upon the removal of the cap 24*h*.

The open end of the upper body 37*h* can be closed hermetically on circular projections 105*h* by means of a shaped cover 83*h* having a central cylinder 82*h* with grooves 90*h* in the bottom portion and flanged edge 86*h* in the top portion, to which edge an aerosol filter 23*h* is secured by means of a thread 22*h*.

The upper body 37*h* and the lower body 43*h* with the connecting sleeve 88*h*, the cover 83*h* with the central cylinder 82*h*, the shaped part 100*h* with the cylinder 101*h*, rack 15*h*, overflow means 6*h*, inner partition 102*h*, central connecting sleeve 38*h* and central pipe 31*h* form four intercommunicating circular chambers. The upper two chambers, 106*h* and 107*h*, form a first receptacle 21*h*. Into these latter chambers are charged sorbing materials 18*h*. The chamber 106*h* is divided by means of partitions 19*h* into sections 20*h*, while into the chamber 107*h* are placed filtering materials 17*h*. The lower two spaces form first 11*h* and second 7*h* chambers of a second receptacle 12*h*. The first receptacle 21*h* communicates with the outer medium through the openings 90*h* and cylinder 82*h*, and with the second receptacle 12*h*—through the openings 14*h*, while the chamber 7*h* of said second receptacle, in turn, communicates with the interior of the vessel 1*h* through an opening 8*h*.

For the purpose of storing and transporting the high-purity substance in the vessel 1*h* without impairing the quality of said substance, the central pipe 31*h* is sealed hermetically by means of a film 30*h* secured by the thread 22*h* on the top end 103*h* of the cone 29*h*; then, the cap 24*h* with a ground coupling 28*h* is set on the ground cone 29*h*, thereby effecting the isolation of the opening 34*h* of a second auxiliary chamber 36*h* from the outside medium.

When the pressure inside the vessel 1*h* is reduced, the outside medium (its movement shown by arrow) passing through the filtering materials 23*h* to the interior space of the cylinder 82*h* is purified from mechanical impurities; upon having passed through the grooves 90*h*, the outside medium enters the first receptacle 21*h* where it is purified from mechanical and chemical impurities with the aid of the sorbing materials 18*h* disposed in the chambers 106*h* and 107*h* of said first receptacle 21*h* and then with the aid of the filtering materials 17*h*, whereupon said outside medium passes through the openings 14*h* into the second receptacle 12*h* in which it forces the liquid sorbent 5*h* through the grooves 90*h* of the overflow means 6*h* from the first chamber 11*h* into the chamber 7*h*. The outside medium, which in the course of bubbling through the liquid sorbent 5*h* has been washed from the traces of impurities, passes through the opening 8*h* and along a clearance 91*h* to the interior of the vessel 1*h*, whereby the pressure inside the latter is balanced with that of the outside medium.

In case the pressure inside the vessel 1*h* exceeds that of the outside medium, the gas-vapor mixture travels the above-described path in the reverse sequence (the movement of the gas-vapor mixture shown by broken arrow), that is, the gas-vapor mixture passing up through the clearance 91*h* enters through the opening 8*h* the last chamber 7*h* of the second receptacle 12*h* and forces the liquid sorbent 5*h* into the chamber 11*h* (the position of the liquid sorbent shown by broken line). Reacting with the liquid sorbent 5*h*, filtering materials 17*h*, sorbing materials 18*h*, decontaminated gases leave through the filtering materials 23*h* into the outside medium.

Figure 26:
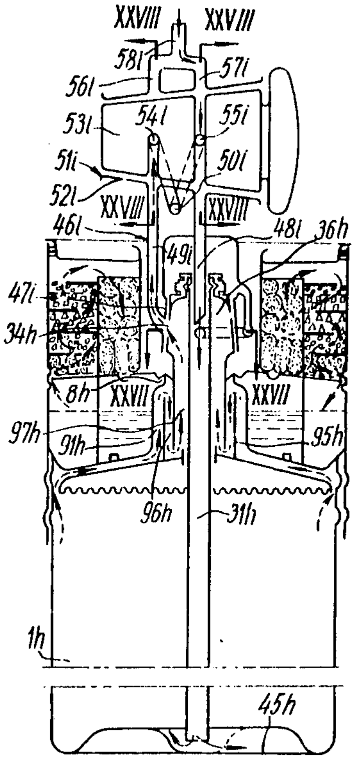
FIG. 26 illustrates the shut-off filtering device, as shown in FIG. 23, conduits of the attachment cock being in a position ready for filling the vessel with a high-purity substance.
Figure 27:
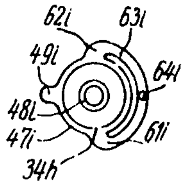
FIG. 27 shows a section on the line XXVII—XXVII of FIG. 26.
Figure 28:
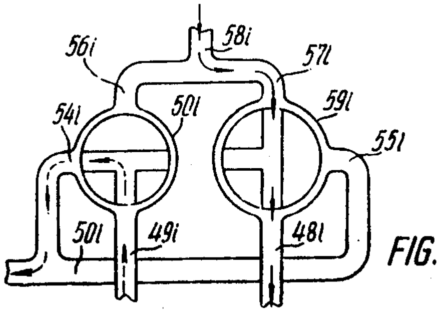
FIG. 28 shows two sections XXVIII—XXVIII in FIG. 26, conventionally turned through 90°.

FIGS. 23, 24, 25 and 26, 27, 28 illustrate the shut-off filtering device, as shown in FIG. 21, on which there is fitted an attachment 46*i* adapted for flushing the internal surface of the vessel 1*h* with a high-purity substance (FIGS. 23, 24, 25) and for filling said vessel 1*h* with the high-purity substance (FIGS. 26, 27 and 28).

The attachment 46*i* being essentially the attachment 46*c* described hereinabove in connection with FIGS. 4, 5, 6, 7, 8 and 9, presented hereinbelow is the description of only those elements of the attachment which take part in the operation of the shut-off filtering device when flushing and filling the vessel 1*h* with a high-purity substance.

For the purpose of flushing the internal surface of the vessel 1*h*, pressure is applied by means of the attachment 46*i* (or, on the contrary, by means of the vessel 1*h*) through the cone 29*h* of the central connecting sleeve 38*h* onto the inner partition 102*h* of the shaped part 100*h*, and the cone-shaped projection 84*h* forming a sealing groove sets down onto the connecting sleeve 88*h* and closes hermetically the opening 8*h*. As a result of this closure, the interior of the vessel 1*h* is fully disconnected from the outside medium. Then, a plug 53*i* of a cock 51*i* is shifted to the position as in FIG. 24, which shows two sections XXIV—XXIV of the cock 51*i*, defined by parallel planes in FIG. 23, conventionally turned through 90°. When so doing, the opening 34*h* is in the position shown in FIG. 25. In this position, the high-purity substance via manifold 58*i*, conduit 56*i*, plug 53*i*, conduit 49*i* and opening 34*h* goes into the second auxiliary chamber 36*h* whence, filling conduits 97*h* and 96*h*, it flows via conduit 91*h* onto the leaf-type distributor 96*h* and, with the latter's aid, is distributed over the walls of the vessel 1*h* (the movement of the high-purity substance shown in FIGS. 23 and 24 by arrow).

Figures 23, 25:
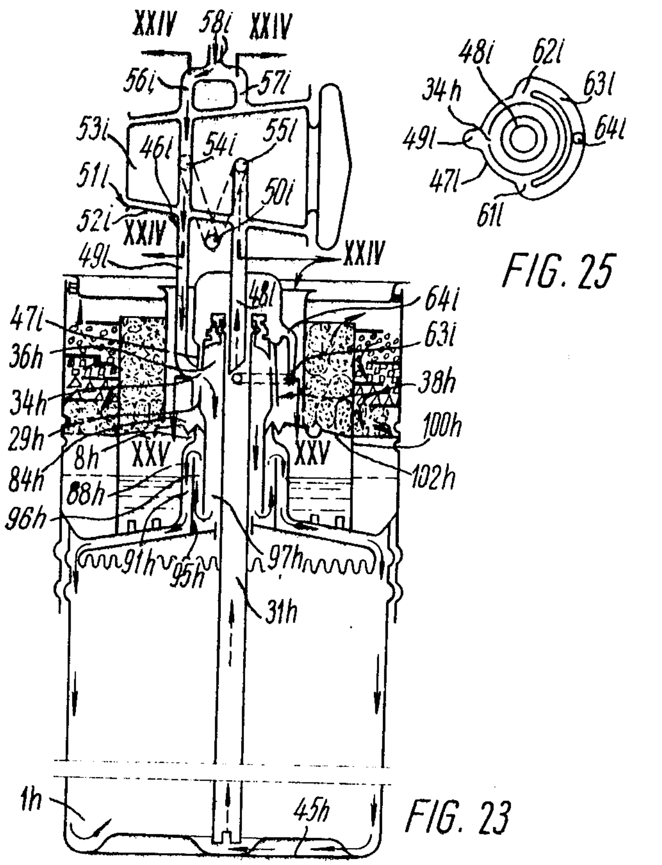
FIG. 23 illustrates the shut-off filtering device, as shown in FIG. 21, on which there is fitted an attachment adapted for flushing the internal surface of the vessel with a high-purity substance.
FIG. 25 shows a section on the line XXV—XXV of FIG. 23.
Figure 24:
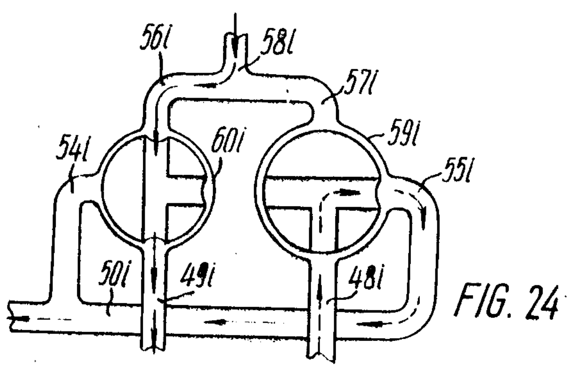
FIG. 24 shows two sections XXIV—XXIV, defined by parallel planes in FIG. 23, conventionally turned through 90°.

As the substance accumulates on the bottom 45*h* of the vessel, it is sucked in the form of a gas-vapor liquid emulsion along the central pipe 31*h* into a conduit 48*i* and, via the conduit in the plug 53*i* of the cock 51*i* and a conduit 55*i*, enters a manifold 50*i* (the movement of the emulsion shown in FIGS. 23 and 24 by broken arrow).

FIG. 26 illustrates the shut-off filtering device according to FIG. 21, on which there is fitted (in the position shown in FIG. 28) the attachment 46*i* adapted for filling the vessel 1*h* with a high-purity substance.

Since the only difference of the filling process from the flushing one resides in the position of conduits in the plug 53*i* of the cock 51*i* with respect to conduits in a body 52 of said cock 51*i* (FIG. 28), all the reference numerals in FIGS. 23, 24 and 25 remain completely the same for defining the respective positions in FIGS. 26, 27 and 28.

For filling the vessel 1*h* with a high-purity substance, the plug 53*i* of the cock 51*i* is shifted, by turning it through 90°, into position as shown in FIG. 28. FIG. 28 shows two sections XXVIII—XXVIII of the cock 51*i*, defined by parallel planes in FIG. 26, conventionally turned through 90°. The opening 34*h* is, at the same time, in the position as shown in FIGS. 23, 24, 25 and 26. In this position of the plug 53*i* and opening 34*h* the high-purity substance via the manifold 58*i*, conduit 57*i*, conduit in the plug 53*i* and conduit 48*i* goes along the central pipe 31*h* to the interior of the vessel 1*h*, thus filling the latter (the movement of the high-purity substance shown in FIGS. 26 and 28 by arrow).

Air and vapors are sucked from the vessel 1*h* through clearances 91*h*, 96*h* and 97*h*, opening 34*h*, along the conduit 49*i*, conduit in the plug 53*i* and conduit 54*i* into the manifold 50*i* (the movement of gases and vapors shown in FIGS. 26 and 27 by broken arrow).

After the vessel 1*h* is filled with the high-purity substance, the pressure inside the central pipe 31*h* and vessel 1*h* should be balanced with that of the outside medium. To this end, the conduits 48*i*, 49*i*, 56*i* and 57*i* are closed from each other by means of the plug 53*i* of the cock 51*i*; the attachment 46*i* is released and, by being turned through 90°, is shifted to the position as shown in FIG. 27; the compressed inner partition expands and, moving somewhat upwards, forms a circular opening 8*h* which effects the communication of the interior of the vessel 1*h* with the outside medium via the shut-off filtering device. As a result, the outside medium purified in accordance with the technique disclosed in the description of FIG. 21 passes via the clearances 8*h* and 91*h* to the interior of the vessel 1*h*, and via the clearances 96*h*, 97*h* (forcing, at the same time, the liquid sorbent 5*h* into the second auxiliary chamber 36*h*), openings 34*h* and 61h, conduits 63i and 64i enters the interior of the central pipe 31h, thus balancing the pressure inside said vessel and central pipe with that of the outside medium.

Figures 29, 30:
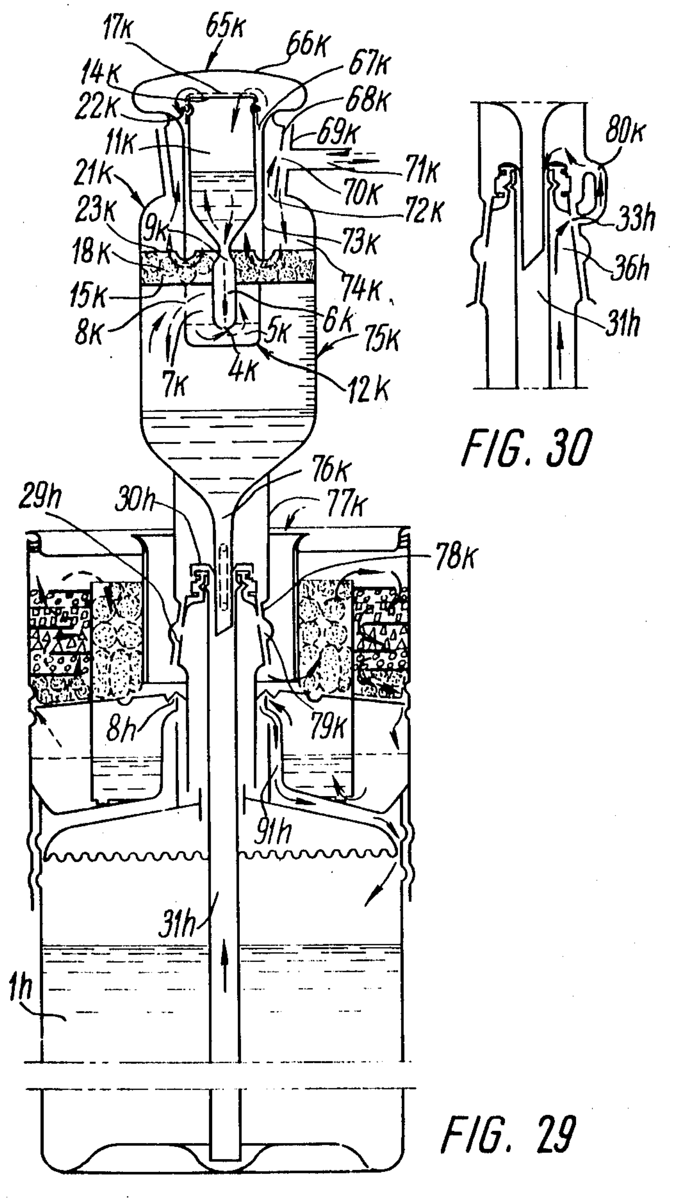
FIG. 29 illustrates the shut-off filtering device, as shown in FIG. 21, on which there is fitted an attachment adapted for removing the high-purity substance from the vessel into a burette.
FIG. 30 shows the position of the burette and conduits of the shut-off filtering device, as shown in FIG. 29, following the removal of the high-purity substance from the vessel.

FIG. 29 illustrates the shut-off filtering device, as shown in FIG. 21, on which there is fitted an attachment 65k adapted for removing the high-purity substance from the vessel 1h into a burette 75k.

Since the attachment 65k is essentially the attachment 65d described hereinabove in connection with FIGS. 10 and 11, presented hereinbelow is the description of only those elements of the attachment which take part in the operation of the shut-off filtering device when removing the high-purity substance from the vessel or filling the latter with said high-purity substance.

In order to remove from the vessel 1h the high-purity substance, the burette 75k together with a ground coupling 78k connected thereto is set onto the ground cone 29h of the shut-off filtering device of the vessel 1h. When so doing, a spout 76k of the burette 75k pierces the film 30h and is received by the central pipe 31h of the shut-off filtering device of the vessel 1h. Thereupon, a vacuum line is connected to a pipe 71k, and there takes place the evacuation of the interior spaces of the burette 75k and of the central pipe 31h through a shut-off filtering means of the burette 75k. As a result, the outside medium purified in the shut-off filtering device of the vessel 1h in a manner described hereinabove (cf. description of FIG. 21), after having passed inside the vessel through the opening 8h and clearance 91h, forces the contents of the vessel 1h through the central pipe 31h into the burette 75k (the movement of gases and vapours of the high-purity substance into the burette 75k shown in FIG. 29 by arrow).

Gases and vapors from the central pipe 31h and the burette 75k via opening 8k pass to a last chamber 7k of the shut-off filtering means of the burette 75k and force the liquid sorbent 5k via an overflow means 6k into a first chamber 11k. In the process of contacting the liquid sorbent 5k, filtering materials 17k, 23k and sorbing materials 18k, the gases and vapors are decontaminated and, via opening 70k in a ground cone 68k and coupling 69k and along the pipe 71k, are sucked out into the vacuum system.

After the burette 75 is filled, the opening in the coupling 69k is closed with the surface of the cone 68k by turning a handle 66k.

For the purpose of removing the burette 75k from the cone 29h of the shut-off filtering device of the vessel 1h, said burette is turned through 90° until the opening 33h in the cone 29h is aligned with a conduit 80k in the coupling 78k (FIG. 30); at the same time, the interior spaces of a pipe union 77k of the burette 75k and the central pipe 31h of the shut-off filtering device are filled with purified outside medium supplied from the second auxiliary chamber 36h through the opening 33h and conduit 80k until the inside pressure is balanced with that of the outside medium (the movement of the purified outside medium shown in FIG. 30 by arrow).

When emptying the burette 75k for the purpose of using the high-purity substance, the opening 70k in the cone 68k is aligned with that in the coupling 69k. When so doing, the outside medium (its movement shown by broken line) passes along the pipe 71k and through a circular clearance 72k into a first receptacle 21k of the shut-off filtering device, and filters through the filtering materials 23k and sorbing materials 18k on its way down on the outer side of a cylinder 73k and then up on the inner side of said cylinder 73k, being purified from mechanical and chemical impurities. Passing up through a circular clearance 67k towards a top funnel 14k of the first chamber 11k of the second receptacle 12k, the purified outside medium forces the liquid sorbent 5k through an opening 9k, overflow means 6k and opening 4k into the chamber 7k (the position of the liquid sorbent shown by broken line), is purified from the traces of impurities in the course of bubbling and, via the opening 8k, passes inside the burette 75k, balancing the pressure inside the latter with that of the outside medium. The high-purity substance to be used is fed under static pressure through the spout 76k of the burette 75k.

Figure 31:
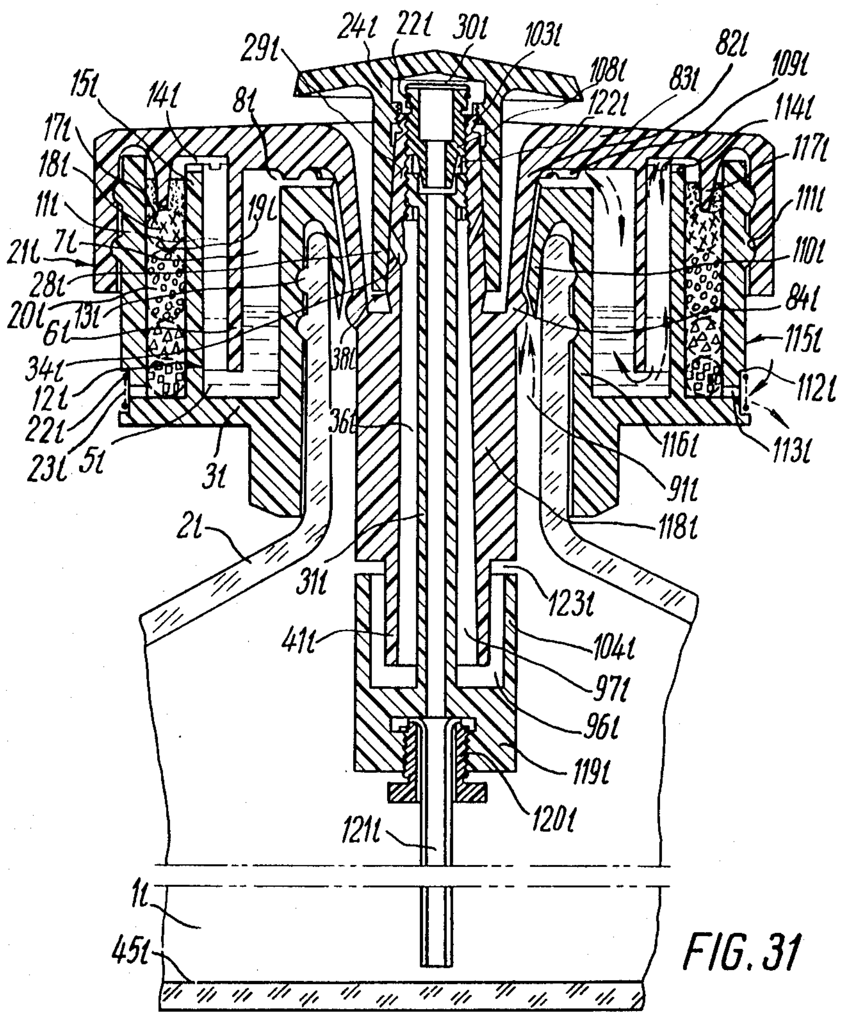
FIG. 31 illustrates the shut-off filtering device to be used in vessels adapted for storing and transporting high-purity substances and secured on the neck of a vessel, wherein sections of the first receptacle filled with filtering and sorbing materials are placed coaxial with chambers of said other receptacle in which the liquid sorbent flows over.

FIG. 31 illustrates the shut-off filtering device of the vessel 1l, secured on the neck 2l of said vessel, in which device sections 20l of a first receptacle 21l filled with filtering materials 17l and sorbing materials 18l are placed coaxial with chambers 7l and 11l of a second receptacle 12l in which a liquid sorbent 5l flows over.

The distinguishing feature of the present version of the shut-off filtering device according to the invention resides in that, when screwing a cover 83l onto a body 115l, the shut-off filtering device is automatically brought into communication with the interior of the vessel 1l owing to the fact that a sealing projection 84l of the cover 83l is lowered and disconnected from a sealing edge 110l of the body 115l.

When unscrewing the cover 83l from the body 115l, the sealing projection 84l, going upwards, causes the sealing edge 110l to wedge between said sealing projection and the neck 2l of the vessel 1l, thus breaking the communication of the interior of the vessel 1l with the shut-off filtering device and, consequently, with the outside medium.

The shut-off filtering device according to the present embodiment thereof consists of the body 115l hermetically secured by means of a union 13l to the neck 2l of the vessel 1l, the shaped cover 83l adapted to be screwed onto the body 115l, a screw-on cap 24l, a central pipe 31l, a through tipe 108l and a pipe 121l adapted to be secured to the central pipe 31l with the aid of a threaded bushing 120l.

The body 115l has a bottom 3l with three concentrically arranged cylinders adjacent thereto: the outer cylinder defines said first receptacle 21l and is provided on top with a screw thread 111l designed for securing the cover 83l and in the bottom portion, on the level of the inner plane of the bottom 3l—with openings 113l and a circular groove 112l in which an aerosol filter 23l is secured by means of threads 22l; the middle cylinder is essentially a partition 15l between the first receptacle 21l and the second receptacle 12l, provided with grooves 114l serving for the passage of gases in case the cover 83l comes into contact with said partition; the inner cylinder, 116l, is provided with the inside circular sealing edge 110l and with the union 13l serving to secure the body 115l to the neck 2l of the vessel 1l.

Into the circular groove between the outer and middle cylinders are placed the sorbing materials 18l and filtering materials 17l divided by partitions 19l into the sections 20l. Into the circular groove formed by the middle and inner cylinders is poured the liquid sorbent 5l.

The body 115l can be manufactured by the stamping technique.

Inside the cover 83l adapted to be screwed onto the body 115l provision is made of: two concentrically arranged cylinders, of which one, 117l, is sunk into the sorbing materials and makes for the purification of the outside medium when passed through the union 111l, while the other cylinder, 6l, is essentially the overflow means of the second receptacle 12l; concentrically arranged projections 109l serving to ensure the passage of gases in case the cover 83l comes into contact with the inner cylinder 116l; a cylindrical pipe union 118l terminating with a pipe 41l and having the sealing projection 84l on the level of the edge 110l of the body 115l.

From the outside of the cover 83l, in the center thereof, provision is made of a countersunk central connecting sleeve 38l in the form of a ground cone 29l with an opening 34l and an elongated ring 103l threaded outside and inside, to which ring there is hermetically joined from the inside the central pipe 31l and the tip 108l sealing the latter, the ground cap 24*l* being screwed on said end from the outside.

The cover 83*l* and the cap 24*l* can likewise be manufactured by die stamping technique.

The central pipe 31*l* has a threaded end which can be retained in the vertical position, said end being instrumental in the adjustment of the value of a clearance 123*l*; the lower end of said pipe is fashioned as a sleeve with a pipe 104*l* and thick bottom 119*l* in which there is secured by means of the bushing 120*l* the pipe 121*l*.

The through tip 108*l* adapted to be screwed into the elongated end 103*l* of the central connecting sleeve 38*l* terminates in the bottom portion with a cone adapted to retain in place and seal (sealing 122*l*) the central pipe 31*l*. On top of the tip 108*l* there is hermetically secured a film 30*l* sealed by means of the thread 22*l* wound thereon.

For the purposes of storing and transporting the high-purity substance in the vessel 1*l* without impairing the quality of said substance, the tip 108*l* or the elongated end 103*l* of the central connecting sleeve 38*l* is sealed hermetically by means of the film 30*l* secured by the thread 22*l* on the top end 103*l* of the cone 29*l*; then, the cap 24*l* with a ground coupling 28*l* is set on the ground cone 29*l*, thereby effecting the isolation of the opening 34*l* of a second auxiliary chamber 36*l* from the outside medium.

When the pressure inside the vessel 1*l* is reduced, the outside medium (its movement shown by arrow) passes through the filtering materials 23*l* and opening 113*l* into the first receptacle 21*l* where it is purified from mechanical and chemical impurities with the aid of the sorbing materials 18*l* and filtering materials 17*l* disposed in the sections 20*l*. Upon having passed through an opening 14*l* to the first chamber 11*l* of the second receptacle 12*l*, the outside medium forces the liquid sorbent 5*l* via the overflow means 6*l* into the chamber 7*l*. The outside medium, which in the course of bubbling through the liquid sorbent 5*l* has been washed from the traces of impurities, passes through an opening 8*l* and via clearance 91*l* to the interior of the vessel 1*l*, whereby the pressure inside the latter is balanced with that of the outside medium.

In case the pressure inside the vessel 1*l* exceeds that of the outside medium, the gas-vapor mixture travels the above-described path in the reverse sequence (the movement of the gas-vapor mixture shown by broken arrow), that is, the gas-vapor mixture going up the clearance 91*l* enters through the opening 8*l* the chamber 7*l* of the second receptacle 12*l* and forces the liquid sorbent 5*l* into the chamber 11*l* (the position of the liquid sorbent shown by broken line). Reacting with the liquid sorbent 5*l*, filtering materials 17*l*, sorbing materials 18*l*, decontaminated gases leave through the filtering materials 23*l* into the outside medium.

Figures 35, 36, 37:
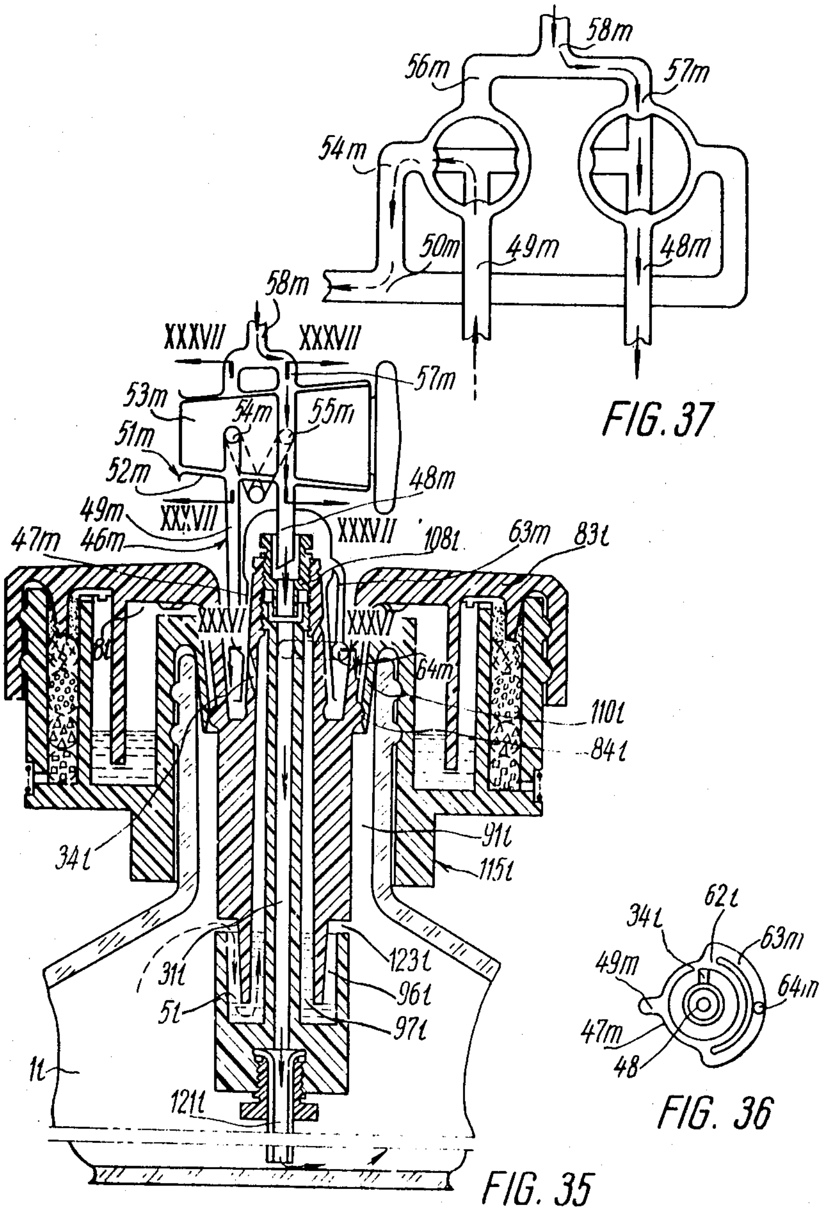
FIG. 35 illustrates the shut-off filtering device, as shown in FIG. 32, conduits of the attachment cock being in a position ready for filling the vessel with a high-purity substance.
FIG. 36 shows a section on the line XXXVI—XXXVI of FIG. 35.
FIG. 37 shows two sections XXXVII—XXXVII, defined by parallel planes in FIG. 35, conventionally turned through 90°.

FIGS. 32, 33, 34 and 35, 36, 37 illustrate the shut-off filtering device according to FIG. 31, on which there is fitted (in the position shown in FIG. 33) an attachment 46*m* adapted for flushing the internal surface of the vessel 1*l* with a high-purity substance (FIGS. 32, 33, 34) and for filling said vessel 1*l* with the high-purity substance (FIGS. 35, 36 and 37).

The attachment 46*m* being essentially the attachment 46*c* described hereinabove in connection with FIGS. 4, 5, 6, 7, 8 and 9, presented hereinbelow is the description of only those elements of the attachment which take part in the operation of the shut-off filtering device when flushing and filling the vessel 1*l* with a high-purity substance.

For the purpose of flushing the internal surface of the vessel 1*l*, the cover 83*l* is unscrewed from the body 115*l* until the circular projection 84*l* going upwards causes the sealing edge 110*l* to wedge between said circular projection and the neck 2*l* of the body of vessel 1*l*. This done, there takes place the discontinuation of the communication of the interior of the vessel 1*l* with the shut-off filtering device and, consequently, with the outside medium.

Figures 32, 34:
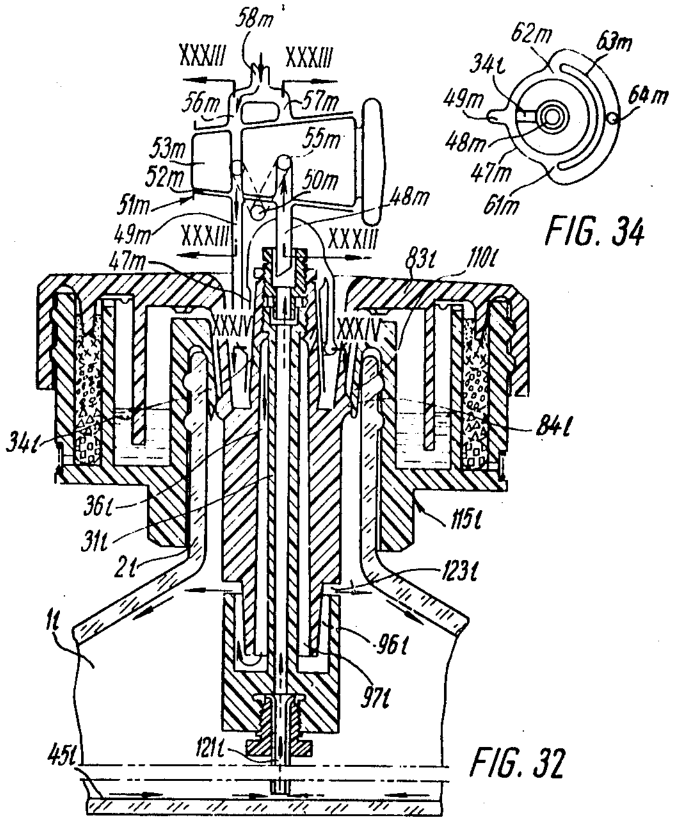
FIG. 32 illustrates the shut-off filtering device, as shown in FIG. 31, on which there is fitted an attachment adapted for flushing the internal surface of the vessel with a high-purity substance.
FIG. 34 shows a section on the line XXXIV—XXXIV of FIG. 32.
Figure 33:
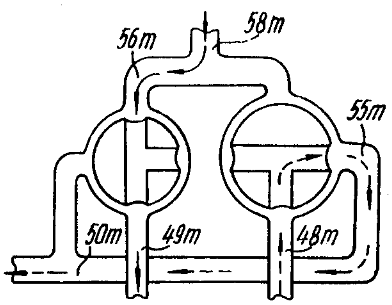
FIG. 33 shows two sections XXXIII—XXXIII, defined by parallel planes in FIG. 32, conventionally turned through 90°.

Then, a plug 53*m* of a cock 51*m* is shifted to the position as in FIG. 33, which shows two sections XXXIII–XXXIII of the cock 51*m*, defined by parallel planes in FIG. 32, conventionally turned through 90°. When so doing, the opening 34*l* is in the position shown in FIG. 34. In this position, the high-purity substance via manifold 58*m*, conduit 56*m* of a body 52*m*, plug 53*m*, conduit 49*m* and the opening 34*l* passes into the second auxiliary chamber 36*l* whence, filling conduits 97*l* and 96*l*, it is pulverized via clearance 123*l* onto the internal surface of the vessel 1*l* (the movement of the high-purity substance shown in FIGS. 32 and 33 by arrow).

As the substance accumulates on the vessel bottom 45*l*, it is sucked in the form of a gas-vapor-liquid emulsion along the pipe 121*l* and the central pipe 31*l* into a conduit 48*m* and, via the conduit in the plug 53*m* of the cock 51*m* and a conduit 55*m*, enters a manifold 50*m* (the movement of the emulsion shown in FIGS. 32 and 33 by broken arrow).

FIG. 35 illustrates the shut-off filtering device according to FIG. 31, on which there is fitted (in the position shown in FIG. 37) the attachment 46*m* adapted for filling the vessel 1*l* with a high-purity substance.

Since the only difference of the filling process from the flushing one resides in the position of conduits in the plug 53*m* of the cock 51*m* with respect to conduits in the body 52*m* of the cock 51*m* (FIG. 37) all the reference numerals in FIGS. 32, 33 and 34 remain completely the same for defining the respective positions in FIGS. 35, 36 and 37.

For filling the vessel 1*l* with a high-purity substance, the plug 53*m* of the cock 51*m* is shifted, by turning it through 90°, into position as shown in FIG. 37. FIG. 37 shows two sections XXXVII–XXXVII of the cock 51*m*, defined by parallel planes in FIG. 35, conventionally turned through 90°. The opening 34*l* is, at the same time, in the position as shown in FIGS. 32, 33, 34 and 35.

In this position of the plug 53*m* and opening 34*l* the high-purity substance via the manifold 58*m*, conduit 57*m*, conduit in the plug 53*m* and conduit 48*m* goes along the central pipe 31*l* and pipe 121*l* to the interior of the vessel 1*l*, thus filling the latter (the movement of the high-purity substance shown in FIGS. 35 and 37 by arrow).

Air and vapors are sucked from the vessel 1*l* through clearances 123*l*, 96*l*, 97*l*, opening 34*l*, along the conduit 49*m*, conduit in the plug 53*m* and conduit 54*m* into the manifold 50*m* (the movement of gases and vapours shown in FIGS. 35 and 37 by broken arrow).

After the vessel 1*l* is filled with the high-purity substance, the pressure inside the central pipe 31*l* and vessel 1*l* should be balanced with that of the outside medium, for the purpose of disconnecting the vessel 1*l* from the attachment 46*m*. To this end, the conduits 48*m*, 49*m*, 56*m* and 57*m* are closed from each other by means of the plug 53*m* of the cock 51*m*; the attachment 46*m* (or the vessel 1*l* with the shut-off filtering device) is shifted, by turning it through 90°, to the position as shown in FIG. 36; the cover 83*l* of the shut-off filtering device is screwed onto the body 115*l*, the circular projection 84*l* goes down, gets disconnected from the sealing edge 110*l* and effects via the conduits 8*l* and 91*l* the communication of the interior of the vessel 1*l* with the shut-off filtering device and, consequently, with the outside medium. As a result, the outside medium purified in accordance with the technique disclosed in the description of FIG. 31 passes via the clearances 8*l* and 91*l* into the interior space of the vessel 1*l*, and via the clearances 123*l*, 96*l*, 97*l* (forcing, at the same time, the liquid sorbent 5*l* into the clearance 97*l*), openings 34*l* and 62*l*, conduits 63*m* and 64*m* enters the interior space of the tip 108*l* and central pipe 31*l* and of the pipe 121*l*, thus balancing the pressure inside the vessel and pipes with that of the outside medium.

Figures 38, 39:
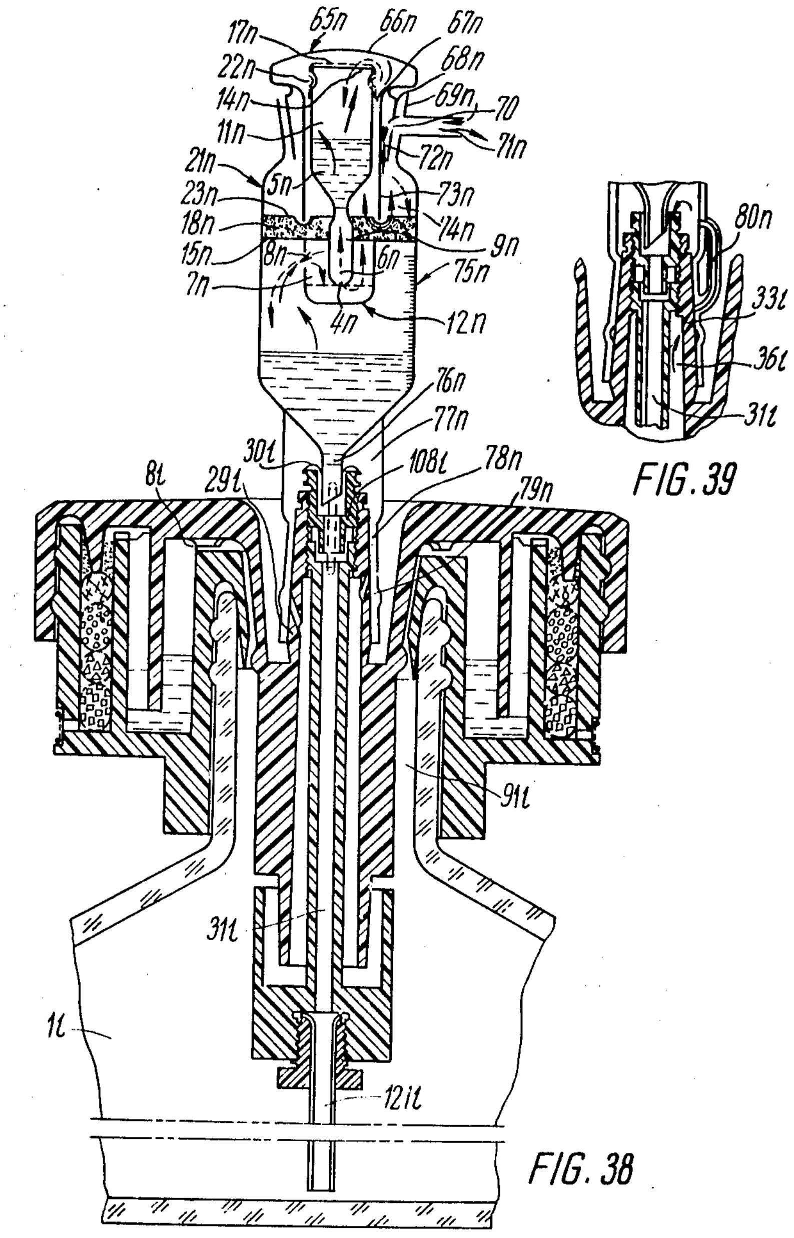
FIG. 38 illustrates the shut-off filtering device, as shown in FIG. 31, on which there is fitted an attachment adapted for removing the high-purity substance from the vessel itno a burette.
FIG. 39 illustrates the position of the burette and conduits of the shut-off filtering device, as shown in FIG. 38, following the removal of the high-purity substance from the burette.

FIGS. 38 illustrates the shut-off filtering device, as shown in FIG. 31, on which there is fitted an attachment 65n adapted for removing the high-purity substance from the vessel 1l into a burette 75n.

Since the attachment 65n is essentially the attachment 65d described hereinabove in connection with FIGS. 10 and 11, presented hereinbelow is the description of only those elements of the attachment which take part in the operation of the shut-off filtering device when removing the high-purity substance from the vessel or filling the latter with said high-purity substance.

In order to remove from the vessel 1l the high-purity substance, the burette 75n together with a ground coupling 78n connected thereto is set onto the ground cone 29l of the shut-off filtering device of the vessel 1l. When so doing, a spout 76n of the burette 75n pierces the film 30l and is received by the through tip 108l of the central pipe 31l of the shut-off filtering device of the vessel 1l. Then, a vacuum line is connected to a pipe 71n, and there takes place the evacuation of the interior spaces of the burette 75n, through tip 108l and of the central pipe 31l through a shut-off filtering means of the burette 75n. As a result, the outside medium purified in the shut-off filtering device of the vessel 1l in a manner described hereinabove (cf. description of FIG. 31), after having passed inside the vessel through the opening 8l and clearance 91l, forces the contents of the vessel 1l through the pipe 121l and central pipe 31l into the burette 74n (the movement of gases and vapours and of the high-purity substance into the burette 75n shown in FIG. 38 by arrow).

Gases and vapors from the central pipe 31l and the burette 75n via opening 8n pass to a chamber 7n of the shut-off filtering means of the burette 75n and force the liquid sorbent 5n via an overflow means 6n into a first chamber 11n. In the process of contacting the liquid sorbent 5n, filtering materials 17n, 23n and sorbing materials 18n, the gases and vapors are decontaminated and, via opening 70n in a ground cone 68n and coupling 69n and along the pipe 71n, are sucked out into the vacuum system.

After the burette 75n is filled, the opening in the coupling 69n is closed with the surface of the cone 68n by turning a handle 66n.

For the purpose of removing the burette 75n from the cone 29l of the shut-off filtering device of the vessel 1l, said burette is turned through 90° until the opening 33l in the cone 29l is aligned with a conduit 80n in the coupling 78n (FIG. 39); at the same time, a pipe union 77n, the interior space of the burette 75n and the central pipe 31l of the shut-off filtering device of the vessel 1l are filled with the purified outside medium supplied from the second auxiliary chamber 36l through the opening 33l and conduit 80n until the inside pressure is balanced with that of the outside medium (the movement of the purified outside medium shown in FIG. 39 by arrow).

When emptying the burette 75n for the purpose of using the high-purity substance, the opening 70n in the cone 68n is aligned with that in the coupling 69n. When so doing, the outside medium (its movement shown by broken line) passes along the pipe 71n and through a circular clearance 72n into a first receptacle 21n of the shut-off filtering device, and filters through the filtering materials 23n and sorbing materials 18n on its way down on the outer side of a cylinder 73n and then up on the inner side of said cylinder 73n, being purified from mechanical and chemical impurities. Passing up a circular clearance 67n towards a top funnel 14n of the first chamber 11n of the second receptacle 12n, the purified outside medium forces the liquid sorbent 5n through an opening 9n, overflow means 6n and opening 4n into the chamber 7n (the position of the liquid sorbent shown by broken line), is purified from the traces of impurities in the course of bubbling and, via the opening 8n, passes inside the burette 75n, balancing the pressure inside the latter with that of the outside medium. Further, the high-purity substance is fed under static pressure through the spout 76n of the burette 75n for being used.

I claim:

1. A filtering device comprising a vessel, means for defining first and second receptacles in communication with one another, said first receptacle including filtering means extending thereacross and at least two different solid sorbing materials also extending thereacross, said first receptacle having an opening exposing said filtering means and solid sorbing materials to the atmosphere, means dividing said first receptacle into a plurality of communicating sections for separating said different solid sorbing materials from one another, said second receptacle including a liquid sorbing material at the bottom thereof in spaced and exposed relation with said solid sorbing materials in said first receptacle, means for maintaining the sorbing materials in said receptacles respectively in spaced communicating relation through the interior of said second receptacle, means for defining a first chamber externally of said second receptacle and communicating the interior of the vessel with the interior of the second receptacle, means for dividing said second receptacle into second and third chambers, and overflow conduit means in said third chamber for communicating said second and third chambers with one another such that said liquid sorbing material flows therebetween in response to the difference in pressure between the atmosphere and the interior of the vessel.

2. A shut-off filtering device according to claim 1, arranged outside said vessel and having a protective cap with a cone-shaped ground surface in contact with the ground surface of the neck of said vessel.

3. A shut-off filtering device according to claim 1, wherein said sections filled with said filtering and sorbing materials are positioned above said chambers in which flows the liquid sorbent.

4. A shut-off filtering device according to claim 1, wherein said sections filled with said filtering means and solid sorbing materials are arranged coaxial with said chambers in which said liquid sorbent flows over.

5. A shut-off filtering device according to claim 4, wherein for the purpose of disconnecting the interior of the vessel from said receptacles and from the outside medium, the upper end of the overflow means is provided with a ground surface mating with a corresponding ground surface of a connecting sleeve of the vessel neck by way of mutual axial displacement of said overflow means and said connecting sleeve of the vessel neck in the course of flushing and filling said vessel.

6. A shut-off filtering device according to claim 4, wherein said sections of said first receptacle, filled with the filtering and sorbing materials, are positioned above said second receptacle in which the chambers with the liquid sorbent flowing therein are arranged coaxially.

7. A shut-off filtering device according to claim 4, wherein for the purpose of disconnecting the interior of the vessel from said receptacles and from the outside medium, said connecting sleeve of the vessel neck terminates with a circular sealing projection connectable by way of mutual axial displacement with a projection of a part and with an auxiliary pipe when flushing and filling said vessel.

8. A shut-off filtering device according to claim 4, whose body has flanged edges and a cover with a circular projection, which are mated with each other and with the neck of the vessel during the mutual turn of said cover and said body when flushing and filling the vessel, for isolating the interior of said vessel from said receptacles and from the outside medium.

9. A shut-off filtering device according to claim 1, wherein the third chamber of said second receptacle is connected to the outside medium via the first chamber, the latter being formed by the central pipe of a central connecting sleeve with openings, which central pipe passes through said chambers and said sections of the receptacles, without reaching the bottom of the vessel, and is connected to the internal conical wall of said connecting sleeve by means of an auxiliary pipe which is arranged coaxial with the sleeve and divides the interior of the latter into a first auxiliary chamber and a second auxiliary chamber, said second auxiliary chamber being formed by said auxiliary pipe and the conical wall of said connecting sleeve.

10. A shut-off filtering device according to claim 9, which is arranged inside said vessel.

11. A shut-off filtering device according to claim 9, wherein, for the purposes of transporting and storing substances, onto the conical outer surface of the central connecting sleeve there is fitted a removable cap serving to isolate said auxiliary chambers from the outside medium and to communicate via an opening said first auxiliary chamber with said second auxiliary chamber, which latter chamber receives through an opening the purified outside medium directed via an opening into the interior of said vessel through a hydraulic seal formed by the clearance between said auxiliary pipe and said central connecting sleeve, clearance between the walls of the lower and upper bodies of the device, and pipes serving to interconnect said clearances, said hydraulic seal serving to isolate the interior of said vessel from the outside medium.

12. A shut-off filtering device according to claim 9, wherein for the purposes of storing and transporting substances, onto said conical outer surface of the central pipe of the central connecting sleeve there is fitted said removable cap serving to isolate said second auxiliary chamber from the outside medium.

13. A shut-off filtering device according to claim 9, wherein, for the purposes of flushing the internal surface of said vessel and filling the latter with a substance, onto said conical outer surface of the central pipe of the central connecting sleeve there is fitted an attachment including a bypass cock and a coupling connected thereto and adapted to isolate said first auxiliary chamber from the outside medium and from said second auxiliary chamber connected to the bypass cock which, in its turn, is connected to the inlet end of said central pipe.

14. A shut-off filtering device according to claim 13, wherein, for the purposes of flushing the internal surface of said vessel and filling the latter with a substance, onto said conical outer surface of the central pipe of the central connecting sleeve there is fitted said attachment including a bypass cock and a coupling connected thereto and adapted to isolate from the outside medium said second auxiliary chamber connected by means of a side pipe with the bypass cock which, in its turn, is connected to the inlet end of said central pipe.

15. A shut-off filtering device according to claim 9, wherein, for the purposes of removing substances from the vessel and using them, onto said conical outer surface of the central pipe of the central connecting sleeve there is fitted an attachment including a calibrated burette with a shut-off filtering means, to which burette there is connected a pipe union with a coupling, said coupling serving to isolate said auxiliary chambers from the interior of said central pipe and connect both said auxiliary chambers to each other and to the interior of said vessel.

16. A shut-off filtering device according to claim 15, wherein, for the purposes of removing substances from said vessel and using them, onto said conical outer surface of the central pipe of the central connecting sleeve there is fitted said attachment including a calibrated burettte with a shut-off filtering means, to which burette there is connected a pipe union with a coupling, said coupling serving to isolate said second auxiliary chamber from the interior of said central pipe.

17. A shut-off device as claimed in claim 1 wherein said means for dividing said first receptacle includes a plurality of spaced parallel partitions.

18. A shut-off device as claimed in claim 17 including a plurality of porous containers containing said different solid sorbing materials respectively in a prescribed pattern.

19. A shut-off device as claimed in claim 18 wherein said porous containers are bags.

References Cited

UNITED STATES PATENTS

| | | | |
|---|---|---|---|
| 1,490,186 | 4/1924 | Rowe | 55—355 |
| 1,759,971 | 5/1930 | Austin | 55—388 |
| 2,248,127 | 7/1941 | Schwab | 128—214 |
| 2,735,964 | 2/1956 | Grieve et al. | 220—44 |
| 3,020,128 | 2/1962 | Adcock et al. | 55—387 |
| 3,048,958 | 8/1962 | Barnes | 55—316 |
| 3,475,885 | 11/1969 | Kline | 55—387 |

FOREIGN PATENTS

| | | | |
|---|---|---|---|
| 1,210,953 | 10/1959 | France | 23—259 |

FRANK W. LUTTER, Primary Examiner

B. NUZICK, Assistant Examiner

U.S. Cl. X.R.

23—259; 55—316, 384, 385, 387, 485; 220—44